United States Patent
Idaka et al.

(10) Patent No.: US 8,772,669 B2
(45) Date of Patent: *Jul. 8, 2014

(54) LASER APPARTUS WITH DIGITAL MANIPULATION CAPABILITIES

(75) Inventors: Mamoru Idaka, Osaka (JP); Akio Takeuchi, Osaka (JP); Hideki Yamakawa, Osaka (JP)

(73) Assignee: Keyence Corporation, Osaka (JP)

( * ) Notice: Subject to any disclaimer, the term of this patent is extended or adjusted under 35 U.S.C. 154(b) by 1364 days.

This patent is subject to a terminal disclaimer.

(21) Appl. No.: 12/206,937

(22) Filed: Sep. 9, 2008

(65) Prior Publication Data

US 2009/0078687 A1 Mar. 26, 2009

(30) Foreign Application Priority Data

Sep. 26, 2007 (JP) ................................ 2007-248359

(51) Int. Cl.
*B23K 26/00* (2014.01)

(52) U.S. Cl.
USPC .............. 219/121.6; 219/121.64; 219/121.68; 219/121.61

(58) Field of Classification Search
CPC ...... B23K 26/00; B23K 26/38; B23K 26/032; B23K 26/0807; H04N 1/00283; H04N 1/00129; H04N 2201/3252
USPC ........................ 219/121.11–121.86, 121.87
See application file for complete search history.

(56) References Cited

U.S. PATENT DOCUMENTS

| | | | | |
|---|---|---|---|---|
| 4,647,220 A * | 3/1987 | Adams et al. | ...................... | 374/5 |
| 5,052,816 A * | 10/1991 | Nakamura et al. | ................. | 374/5 |
| 5,131,758 A * | 7/1992 | Heyman et al. | .................... | 374/5 |
| 5,763,853 A * | 6/1998 | Shimomura et al. | ..... | 219/121.62 |
| 5,850,068 A * | 12/1998 | Peters et al. | ............. | 219/121.83 |
| 5,864,114 A * | 1/1999 | Fukuda | .................... | 219/121.83 |
| 5,965,042 A * | 10/1999 | Saitoh | ...................... | 219/121.68 |
| 6,040,550 A * | 3/2000 | Chang | ...................... | 219/121.63 |
| 6,066,829 A * | 5/2000 | Ishikawa | .................. | 219/121.68 |
| 6,075,220 A * | 6/2000 | Essien et al. | ............. | 219/121.63 |
| 6,210,401 B1 * | 4/2001 | Lai | .................................. | 606/12 |
| 6,670,574 B1 * | 12/2003 | Bates et al. | ............. | 219/121.64 |
| 6,720,523 B1 * | 4/2004 | Troitski | ................... | 219/121.69 |
| 6,757,055 B1 * | 6/2004 | Kluft | ............................... | 356/73 |
| 6,791,057 B1 * | 9/2004 | Kratzsch et al. | ......... | 219/121.63 |

(Continued)

FOREIGN PATENT DOCUMENTS

JP H01-162591 6/1989
JP H06-079479 3/1994

*Primary Examiner* — Dana Ross
*Assistant Examiner* — Brett Spurlock
(74) *Attorney, Agent, or Firm* — Kilyk & Bowersox, P.L.L.C.

(57) ABSTRACT

The present invention aims to rapidly and easily create processed data for scan controlling a laser light beam, and to create the processed data for the laser processing apparatus at high precision. A setting plane corresponding to a scanning region of a laser marker is displayed on a processed data generating device. A user operates the processed data generating device to arrange the processing pattern on the setting plane. Here, a marker head coincides an optical axis of the laser light beam L on a position corresponding to the reference point of the processing pattern, and photographs a work W with a camera which light receiving axis is coaxial with the optical axis of the laser light beam L. A photographed image monitor displays the photographed image along with a symbol indicating the position of the light receiving axis of the camera.

15 Claims, 23 Drawing Sheets

(56) References Cited

U.S. PATENT DOCUMENTS

| | | | |
|---|---|---|---|
| 6,856,707 B2* | 2/2005 | Enomoto | 382/277 |
| 6,874,932 B2* | 4/2005 | Devitt et al. | 374/5 |
| 6,940,037 B1* | 9/2005 | Kovacevic et al. | 219/121.64 |
| 7,245,412 B2* | 7/2007 | Bruland et al. | 359/225.1 |
| 7,272,524 B2* | 9/2007 | Brogardh | 702/95 |
| 7,380,717 B2* | 6/2008 | Lubow | 235/462.01 |
| 8,084,713 B2* | 12/2011 | Idaka et al. | 219/121.83 |
| 8,153,931 B2* | 4/2012 | Yamakawa et al. | 219/121.81 |
| 2002/0041717 A1* | 4/2002 | Murata et al. | 382/275 |
| 2004/0056007 A1* | 3/2004 | Troitski | 219/121.69 |
| 2004/0190080 A1* | 9/2004 | Kodama et al. | 358/474 |
| 2005/0051522 A1* | 3/2005 | Troitski | 219/121.69 |
| 2005/0180083 A1* | 8/2005 | Takahara et al. | 361/152 |
| 2005/0267338 A1* | 12/2005 | Lipman | 600/300 |
| 2006/0010331 A1* | 1/2006 | Ohara | 713/323 |
| 2006/0101858 A1* | 5/2006 | Fujii | 65/29.18 |
| 2006/0109507 A1* | 5/2006 | Murata | 358/1.15 |
| 2006/0222025 A1* | 10/2006 | Ono et al. | 372/34 |
| 2007/0086822 A1* | 4/2007 | Sato | 400/129 |
| 2007/0100492 A1* | 5/2007 | Idaka et al. | 700/166 |
| 2007/0157730 A1* | 7/2007 | Ochiai et al. | 73/627 |
| 2007/0284695 A1* | 12/2007 | Zani et al. | 257/607 |
| 2008/0067251 A1* | 3/2008 | Yoshimoto et al. | 235/462.32 |
| 2008/0088869 A1* | 4/2008 | Unno | 358/1.15 |

* cited by examiner

Photographed image monitor 3

Photographed image monitor 3

Photographed image monitor 3

No coordinate system conversion

Mirror-imaging

Rotate 90 degrees

Mirror-imaging + rotate 90 degrees

Rotate 180 degrees

Mirror-imaging + rotate 180 degrees

Rotate 270 degrees

Mirror-imaging + rotate 270 degrees

No coordinate system conversion

Mirror-imaging

Rotate 90 degrees

Mirror imaging + rotate 90 degrees

Rotate 180 degrees

Mirror-imaging + rotate 180 degrees

Rotate 270 degrees

Mirror-imaging + rotate 270 degrees

Arrangement specifying area 12

--PRIOR ART--

—PRIOR ART—

--PRIOR ART--

LASER APPARTUS WITH DIGITAL MANIPULATION CAPABILITIES

The present application claims priority from Japanese Patent Application No. 2007-248359, filed Sep. 26, 2007, which is incorporated herein by reference.

BACKGROUND OF THE INVENTION

1. Field of the Invention

The present invention relates to a laser processing apparatus, a processed data generating method, and a computer program, and particularly relates to improving a method for a user to specify a processing position on an article to be processed when generating processed data for controlling laser processing by the laser processing apparatus.

2. Description of the Related Art

FIG. 20 is a view showing a schematic configuration of a conventional laser processing apparatus 101. The laser processing apparatus 101 is configured by a processed data generating device 1 for generating processed data based on a user operation, and a laser marker 2 for irradiating a work W with a laser light beam L. The laser marker 2 is further configured by a marker head 21 for scanning the laser light beam L on the work W, which is an article to be processed, and a marker controller 22 for performing operation control of the marker head 21 based on the processed data from the processed data generating device 1.

When generating the processed data using the processed data generating device 1, the user needs to designate the processing position on the work W to be irradiated by the laser light beam L as a scanning angle of the laser light beam L by the marker head 21. However, an aim of the user is to perform laser processing on a designated portion on the work W, and it is not easy to accurately specify the scanning angle of the marker head 21 corresponding to this designated portion.

Thus, in a conventional processing apparatus, a task of actually performing the laser processing of the work W, visually checking the processing result, and fine tuning the processing position is repeated. That is, the processing position is specified by trial and error, and thus a working efficiency in creating the processed data is not satisfactory.

An apparatus for irradiating the work W with a visible light beam is known as a laser processing apparatus free of such problems. FIG. 21 is a view showing one example of an improved laser processing apparatus of the conventional art, and shows a configuration of the laser marker 2. The laser light beam generated by a laser oscillation part 211 passes through a beam expander 212, a condenser part 213, a half mirror 214, and a scanning part 215 in order, and then the work W is irradiated with the laser light beam. The scanning angle of the laser light beam L is controlled by the scanning part 215. The visible light beam generated by a light source 217 passes through the half mirror 214 and merges to a light path of the laser light beam, and thereafter, passes through the scanning part 215 and the work W is irradiated with the visible light beam, exactly the same as the laser light beam.

In this laser processing apparatus, a correspondence relationship between an actual position on the work W and the scanning angle of the marker head 21 can be easily specified by irradiating the work W with the visible light beam using the light path of the laser light beam. That is, a spot of the visible light beam is coincided with the designated portion on the work W to be performed with laser processing, and the scanning angle of the marker head 21 at this point is acquired.

In the laser processing apparatus using the visible light beam, the working efficiency in creating the processed data is greatly improved compared to the apparatus in which trial and error needs to be performed. However, the task of coinciding the visible light spot on the designated portion on the work W by changing the scanning angle while visually checking the visible light spot on the work W needs to be performed, and further improvement in the working efficiency is desired. Furthermore, an error by spot diameter and an error by visual checking are inevitable, and thus enhancement in accuracy of the processing position is limited.

Consideration is thus made in taking a picture of the work W with a camera, and specifying the processing position using a photographed image. For instance, if the processing position can be specified on the photographed image, the specific portion on the work W to be performed with laser processing can be directly specified, whereby usability is assumed to be high. However, in the photographed image output from the camera, a distortion is relatively small at a middle of the scanning region of the laser light beam but unignorable distortion occurs at a peripheral part due to a light path difference and an aberration from an optical system and the like. For instance, FIG. 22 shows a photographed image of the middle of the scanning region, and the distortion is relatively small. FIG. 23 is a photographed image of the peripheral part of the scanning region, and a large distortion is found. Furthermore, a difference in the distortion is also found within the photographed image, and the peripheral part of the photographed image has greater distortion compared to the middle even in the photographed image of the middle of the scanning region. Thus, even if the position is specified on the photographed image, the scanning angle corresponding to the relevant position cannot be accurately specified.

Arranging a camera for taking the picture of the work W in the laser processing apparatus has already been proposed (e.g., Japanese Unexamined Patent Publication No. 1-162591 and Japanese Unexamined Patent Publication No. 6-79479). The laser processing apparatus described in Japanese Unexamined Patent Publication No. 1-162591 includes a camera using the path of the laser beam, where a reference light beam is photographed instead of the work W using the camera, and a correction amount of a beam scanner is obtained from a shift amount of a reference position on the photographed image and a position of the reference light beam on the photographed image. That is, the camera is used to compensate the error of the beam scanner, and is not provided to obtain the scanning angle for laser processing the specific portion on the work W desired by the user.

The laser processing apparatus described in Japanese Unexamined Patent Publication No. 6-79479 photographs the work W with the camera, obtains a shift and a tilt from a normal position of the work W based on the photographed image, and adjusts the scanning angle of the laser light beam given in advance. That is, the scanning angle of the laser light beam of when the work W is arranged at the normal position is known, and the scanning angle is automatically fine tuned according to the positional shift of the work on a premise of the known scanning angle. Therefore, the scanning angle corresponding to the specific portion on the work W to which the user desires to perform laser processing is not obtained.

SUMMARY OF THE INVENTION

As described above, when creating processed data for scan controlling a laser light beam, a user needs to specify a processing position on an article to be processed as a scanning angle of a laser processing apparatus, and a task of specifying such processing position is not easy. Furthermore, enhancement in accuracy of the processing position is limited in a conventional method.

In view of the above, it is an object of the present invention to provide a laser processing apparatus capable of rapidly and easily creating the processed data for scan controlling the laser light beam. Another object is to provide a laser processing apparatus capable of creating the processed data at high precision.

Another object is to provide a processed data generating method capable of rapidly and easily creating processed data or creating the processed data at high precision for scan controlling the laser light beam. Another further object is to provide a computer program for causing a computer to generate the processed data.

A laser processing apparatus according to the present invention relates to a laser processing apparatus including a laser light beam source for generating a laser light beam and a scanning section for two-dimensionally scanning an optical axis of the laser light beam based on a processing pattern, and performing laser processing on an article to be processed positioned in a scanning region of the laser light beam, and further has the following configuration.

The laser processing apparatus of a first aspect of the present invention is configured including setting display section for displaying a two-dimensional setting plane corresponding to the scanning region and the processing pattern; a pattern arrangement specifying section for specifying the arrangement of the processing pattern in the scanning region on the setting plane; a reference scan control section for controlling the scanning section so as to substantially coincide the optical axis of the laser light beam on a position in the scanning region corresponding to a reference point of the processing pattern; a photographing section, arranged on the laser light beam source side from the scanning section and including a light receiving axis substantially coaxial with the optical axis of the laser light beam, for photographing at least one part of the article to be processed including the reference point with the optical axis of the laser light beam substantially coincided on the reference point; and a photographed image display section for displaying a photographed image photographed by the photographing section and a position of the light receiving axis on the photographed image.

According to such configuration, the user can arrange the processing pattern on the setting plane using the pattern arrangement specifying section, and can check the arrangement state using the setting display section. The reference scan control section controls the scanning part so as to substantially coincide the optical axis of the laser light beam to the position corresponding to the reference point of the processing pattern, and the photographed image photographed by the imaging section is displayed on the photographed image display section with the position of the light receiving axis in this state.

The light receiving axis of the imaging section is substantially coaxial with the optical axis of the laser light beam, and the position of the light receiving axis on the photographed image corresponds to the reference point specified on the setting plane. That is, the position of the work pointed out by the light receiving axis is irradiated with the laser light beam by specifying the position of the reference point on the setting plane as the processing position. The user can then check the position relationship between the processing pattern and the article to be processed. For instance, the processing position on the article to be processed can be rapidly and easily specified by determining the arrangement of the processing pattern on the setting screen while looking at the photographed image display section.

In addition to the above configuration, according to the laser processing apparatus of a second aspect of the present invention, a processing region for specifying the arrangement of the processing pattern is displayed on the setting plane; and the reference point is a feature point of the processing region. According to such configuration, the position on the article to be processed corresponding to the feature point of the processing region can be checked on the photographed image with respect to the feature point of the processing region. Therefore, the processing pattern can be easily and accurately arranged on the setting plane. For instance, a rectangular triangle, a circle, a fan shape, a line, a circular arc, a dot and the like can be used as the processing region, and a vertex, a center of gravity, a center of a circle, a middle point of a side, and the like can be used as the feature point.

In addition to the above configuration, according to the laser processing apparatus of a third aspect of the present invention, the processing region is a rectangular region, and the reference point is one vertex of the rectangular region. According to such configuration, the processing pattern can be easily and accurately arranged when the processing region is a rectangular region.

In addition to the above configuration, according to the laser processing apparatus of a fourth aspect of the present invention, the setting display section displays the position of the reference point on the setting plane. According to such configuration, the user can recognize the position of the reference point on the setting plane. For instance, the processing region is displayed with a line indicating the outer edge, where if the reference point is a point on the outer edge, the color and the shading are differed from the line, or the style of the line passing through the reference point is differed, so that the reference point can be displayed in a visually recognizable manner.

In addition to the above configuration, according to the laser processing apparatus of a fifth aspect of the present invention, a position corresponding to the light receiving axis of the photographing section is substantially the middle of the photographed image displayed by the photographed image display section. It is not essential to have the light receiving axis at substantially the middle of the photographed image, but the workability can be further enhanced with such configuration.

In addition to the above configuration, according to the laser processing apparatus of a sixth aspect of the present invention, the photographing section includes a two-dimensional imaging element in which great number of light receiving elements is arrayed so that the light receiving axis is positioned substantially at the middle. For instance, it is not essential to have the photographing section as the two-dimensional imaging element and may be a one-dimensional imaging element, but the workability can be further enhanced with such configuration.

In addition to the above configuration, according to the laser processing apparatus of a seventh aspect of the present invention, the photographed image is an enlarged image of at least one part of the article to be processed. According to such configuration, the processing pattern can be aligned while looking at the enlarged image, and can be aligned at high precision which cannot be realized with eyes.

In addition to the above configuration, according to the laser processing apparatus of a eighth aspect of the present invention, an imaging scan control section controls the scanning section, and the photographing section performs photographing based on operation. According to such configuration, when a user operation is performed, such operation can be reflected on the photographed image in real time. Therefore, the user can perform various operations while looking at the photographed image.

In addition to the above configuration, according to the laser processing apparatus of a ninth aspect of the present invention, when the specified arrangement of the processing pattern is changed, the imaging scan control section controls the scanning section, and the photographing section performs photographing. According to such configuration, when the arrangement of the processing pattern is changed, such change can be reflected on the photographed image in real time. Therefore, the user can adjust the arrangement of the processing pattern while looking at the photographed image.

In addition to the above configuration, according to the laser processing apparatus of a tenth aspect of the present invention, a plurality of processing patterns is arranged in the setting plane; and when one of the processing patterns is specified, the imaging scan control section controls the scanning section, and the photographing section performs photographing.

In addition to the above configuration, the laser processing apparatus of an eleventh aspect of the present invention is configured further including a reference point specifying section for specifying the reference point on the setting plane as a relative position with respect to the processing pattern.

In addition to the above configuration, the laser processing apparatus of a twelfth aspect of the present invention is configured further including a processing pattern specifying section for specifying the processing pattern.

In addition to the above configuration, according to the laser processing apparatus of a thirteenth aspect of the present invention, the processing position specifying section displaces in parallel the processing pattern on the setting plane.

In addition to the above configuration, according to the laser processing apparatus of a fourteenth aspect of the present invention, the processing position specifying section rotates the processing pattern on the setting plane with a predetermined point other than the reference point as a center of rotation.

In addition to the above configuration, according to the laser processing apparatus of a fifteenth aspect of the present invention, the reference scan control section obtains a position in the scanning region from the position of the reference point in the setting plane by performing a coordinate system conversion process including rotation or mirror-imaging of a coordinate system; and the photographed image display section displays a photographed image after the conversion process corresponding to the rotation or the mirror-imaging of the coordinate system. According to such configuration, a movement direction of the processing pattern on the setting plane can be coincided with a movement direction of the light receiving axis on the photographed image.

A laser processing method according to a sixteenth aspect of the present invention relates to a processed data generating method of generating processed data for controlling laser processing in a laser processing apparatus including a laser light beam source for generating a laser light beam and a scanning section for two-dimensionally scanning an optical axis of the laser light beam based on a processing pattern, and performing laser processing on an article to be processed positioned in a scanning region of the laser light beam, the laser processing apparatus further including a photographing section, arranged on the laser light beam source side from the scanning section and including a light receiving axis substantially coaxial with the optical axis of the laser light beam, for photographing at least one part of the article to be processed including the reference point with the optical axis of the laser light beam substantially coincided on the reference point and a photographed image display section for displaying a photographed image photographed by the photographing section and a position of the light receiving axis on the photographed image, the method including the steps of: a setting and displaying step of displaying a two-dimensional setting plane corresponding to the scanning region and the processing pattern; a pattern arrangement specifying step of specifying the arrangement of the processing pattern in the scanning region on the setting plane; a reference scan data generating step of generating reference scan data for controlling the scanning section so as to substantially coincide the optical axis of the laser light beam on a position in the scanning region corresponding to a reference point of the processing pattern; and a processed data generating step of generating the processed data based on the processing pattern arranged on the setting plane.

A computer program according to a seventeenth aspect of the present invention relates to a program for causing a computer to execute a processed data generating method of generating processed data for controlling laser processing in a laser processing apparatus including a laser light beam source for generating a laser light beam and a scanning section for two-dimensionally scanning an optical axis of the laser light beam based on a processing pattern, and performing laser processing on an article to be processed positioned in a scanning region of the laser light beam, the laser processing apparatus further including a photographing section, arranged on the laser light beam source side from the scanning section and including a light receiving axis substantially coaxial with the optical axis of the laser light beam, for photographing at least one part of the article to be processed including the reference point with the optical axis of the laser light beam substantially coincided on the reference point, and a photographed image display section for displaying a photographed image photographed by the photographing section and a position of the light receiving axis on the photographed image, the program causing the computer to execute the steps of a setting and displaying step of displaying a two-dimensional setting plane corresponding to the scanning region and the processing pattern; a pattern arrangement specifying step of specifying the arrangement of the processing pattern in the scanning region on the setting plane; a reference scan data generating step of generating reference scan data for controlling the scanning section so as to substantially coincide the optical axis of the laser light beam on a position in the scanning region corresponding to a reference point of the processing pattern; and a processed data generating step of generating the processed data based on the processing pattern arranged on the setting plane.

According to the present invention, the laser processing apparatus capable of rapidly and easily creating the processed data for scan controlling the laser light beam is provided. Furthermore, the laser processing apparatus capable of creating the processed data at high precision is provided.

Furthermore, a processed data generating method capable of rapidly and easily creating the processed data for scan controlling the laser light beam and capable of creating the processed data at high precision is provided. Moreover, a computer program for causing a computer to execute the generation of the processed data is provided.

DETAILED DESCRIPTION OF THE PREFERRED EMBODIMENTS

First Embodiment

Figure 1:
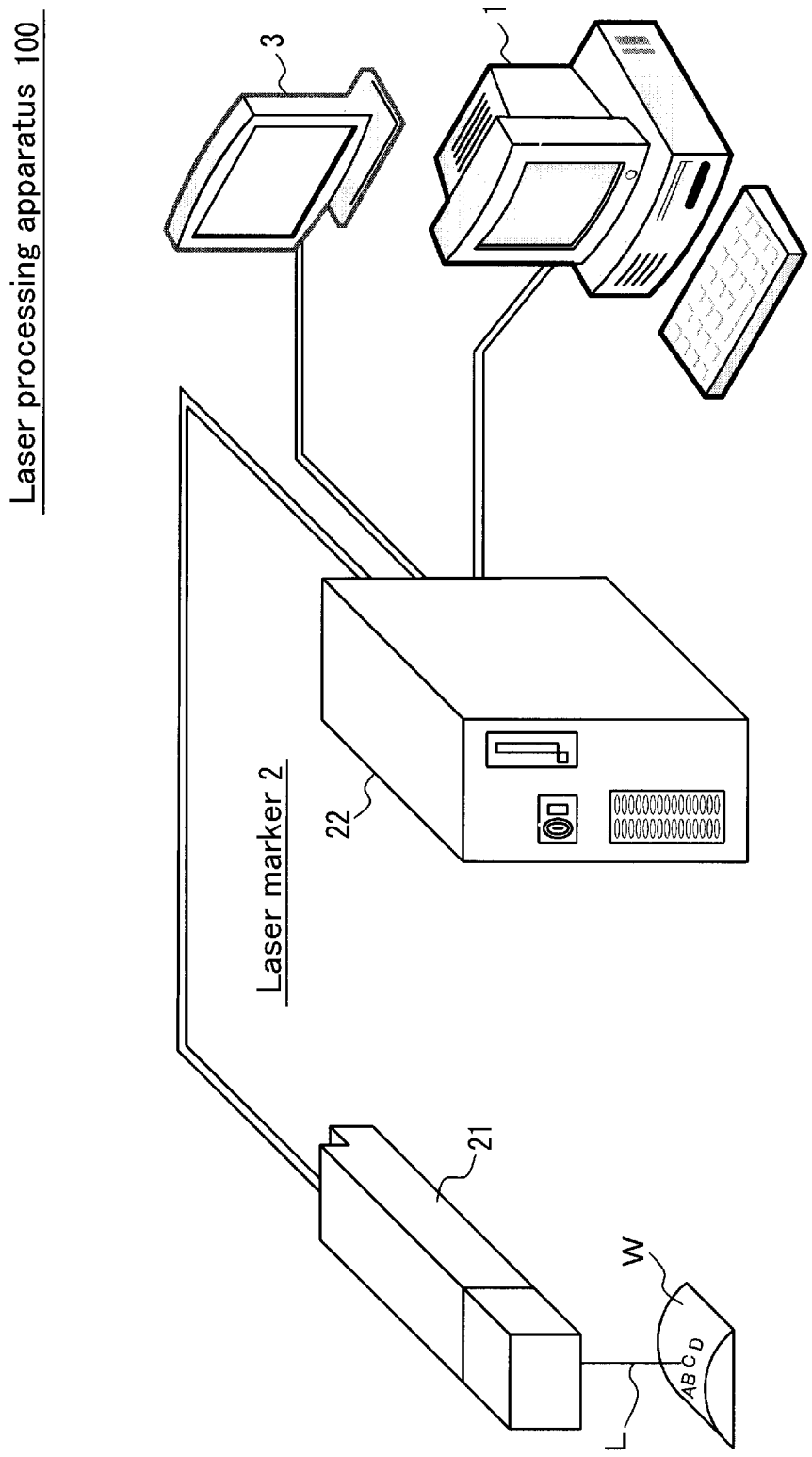
FIG. 1 is a view showing a schematic configuration example of a laser processing apparatus 100 according to a first embodiment of the present invention.

FIG. 1 is a view showing a schematic configuration example of a laser processing apparatus 100 according to a first embodiment of the present invention. The laser processing apparatus 100 is configured by a processed data generating device 1 for generating processed data, a laser marker 2 for irradiating a work W with a laser light beam L, and a photographed image monitor 3 for displaying the photographed image of the work W photographed by the laser marker 2. The laser marker 2 is further configured by a marker head 21 for scanning the laser light beam L, and a marker controller 22 for performing operation control of the marker head 21 based on the processed data from the processed data generating device 1.

In a conventional laser processing apparatus, the processed data is generated while checking if a processing pattern is formed on a specific portion on the work W desired by the user by looking at the work W. On the other hand, in the laser processing apparatus 100 according to the present embodiment, the photographed image monitor 3 for displaying the photographed image of the work W is arranged, and the processed data for performing the desired laser processing is rapidly and easily generated by cooperatively operating the processed data generating device 1 and the photographed image monitor 3. Furthermore, the processing position can be specified at satisfactory precision compared to the conventional laser processing apparatus. The details of such laser processing apparatus 100 will be described below.

(Laser Marker 2)

Figure 2:
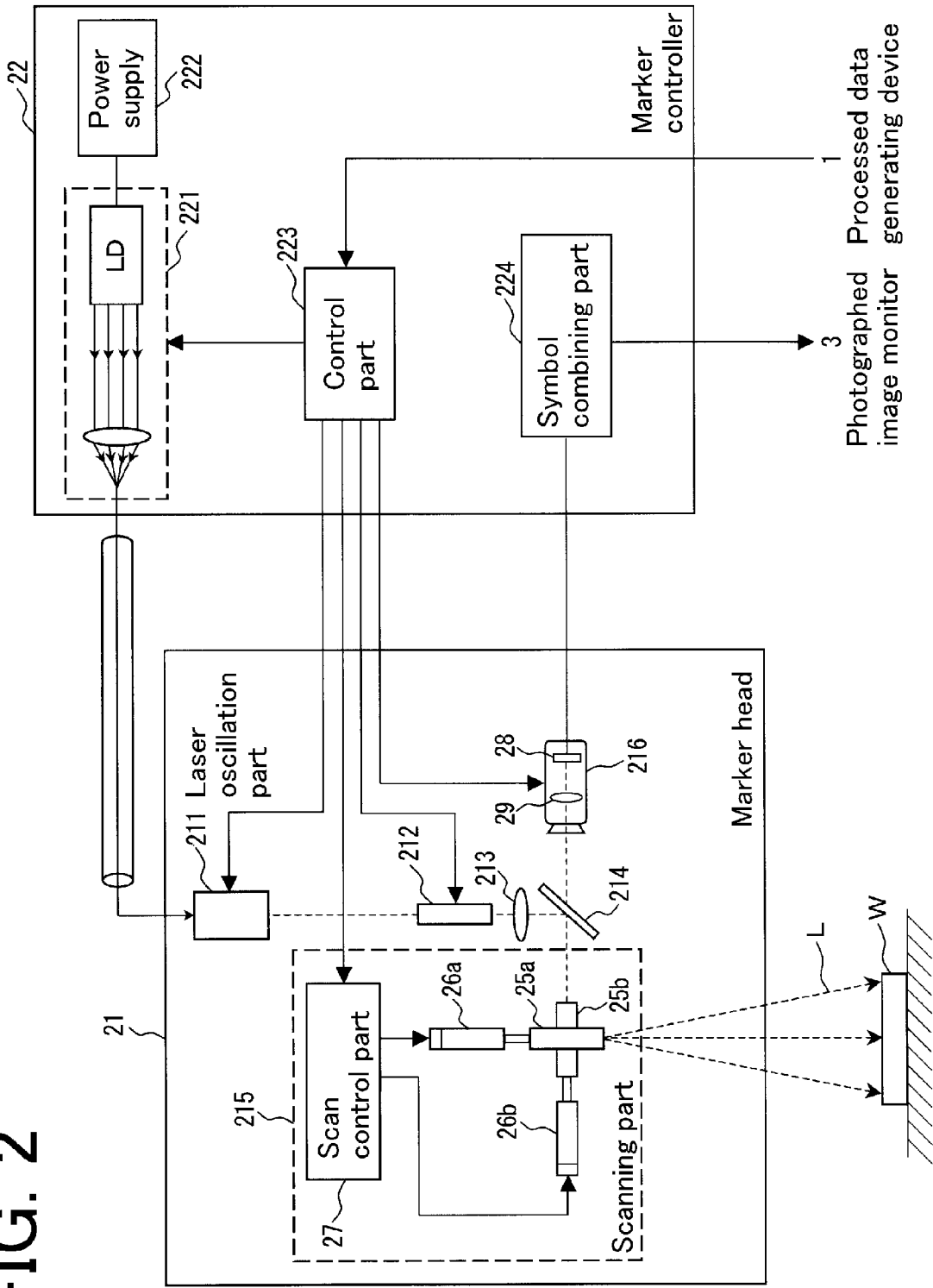
FIG. 2 is a block diagram showing a detailed configuration example of a laser marker 2 of FIG. 1, and shows an internal configuration of a marker head 21 and a marker controller 22.

FIG. 2 is a block diagram showing a detailed configuration example of the laser marker 2 of FIG. 1, and shows an internal configuration of the marker head 21 and the marker controller 22. The marker head 21 is configured by a laser oscillation part 211, a beam expander 212, a condenser part 213, a half mirror 214, a scanning part 215, and a camera 216.

The laser oscillation part 211 is a laser light beam generation section which includes a laser catalyst (not shown) and generates a laser light beam by exciting the laser medium using a laser exciting light beam supplied from the marker controller 22. The laser oscillation part 211 also includes a Q switch (not shown) and performs pulse oscillation for intermittently outputting the laser light beam by being switched ON/OFF by the Q switch. The laser light beam generated by the laser oscillation part 211 passes through the beam expander 212, the condenser part 213, the half mirror 214, and the scanning part 215 in order, and then the work W is irradiated with the laser light beam.

The beam expander 212 includes two lenses arranged on an optical axis of the laser light beam. The beam expander 212 changes a condensing position of the laser light beam L in an optical axis direction by changing a relative distance of the lenses.

The condenser part 213 includes a condenser lens for condensing the laser light beam L on a surface of the work W. The lenses configuring the beam expander 212 may also be used as the condenser lens, in which case, the condenser part 213 does not need to be separately arranged. In this example, the condenser part 213 is arranged between the beam expander 212 and the half mirror 214, but the condenser part 213 may be arranged at other positions such as on a downstream side (work W side) of the scanning part 215.

The scanning part 215 is a two-dimensional scanning section configured by a pair of galvanometer mirrors 25a, 25b, galvanometer motors 26a and 26b for holding the galvanometer mirrors 25a, 25b on a turning axis, respectively, and a scan control part 27 for drive controlling the galvanometer motors 26a, 26b. The laser light beam entering the scanning part 215 is sequentially reflected by the pair of galvanometer mirrors 25a, 25b, and then output towards the work W.

Each galvanometer motor 26a, 26b is arranged such that the turning axes are orthogonal to each other, where two-dimensional scanning of changing the condensing position of the laser light beam within a scanning plane is performed by controlling the angle of each galvanometer mirror 25a, 25b attached to the respective turning axis. Assuming the directions orthogonal to each other in the scanning plane are X direction and Y direction, the laser light beam is scanned in the X direction by an angle of one galvanometer mirror 26a, and the laser light beam is scanned in the Y direction by the angle of the other galvanometer mirror 26b. The scanning plane is defined as a plane perpendicular to a reference axis of the marker head 21. The reference axis is an optical axis of the laser light beam output from the scanning part 215 when the angle of the galvanometer mirrors 25a, 25b are set to the predetermined reference angle.

The camera 216 is an imaging device for imaging the work W, and includes an imaging element 28 and an imaging lens 29. The imaging element 28 is a two-dimensional imaging element in which a light receiving element such as CCD (Charge Coupled Device), CMO (Complementary Metal Oxide Semiconductor) or the like is arrayed two-dimensionally, where the two-dimensional image obtained by photographing the work W is output to the marker controller 22 as the photographed image. The reflected light of the work W entering the marker head 21 follows the path of the laser light beam in an opposite direction, where at least one part passes through the half mirror 214 and reaches the camera 216. The camera 216 receives the transmitted light to photograph the work W.

The camera 216 coincides the light receiving axis of the camera 216 to a focal position of the laser light beam on the work W by being arranged so as to coincide the optical axis of the imaging lens 29 with the optical axis of the laser light beam. That is, the light receiving axis of the camera 216 is separated from the laser optical axis on an upstream side of the scanning part 215, that is, on the side opposite to the work W side with respect to the scanning part 215 on the path of the laser light beam. Thus, the two-dimensional condensing position of the laser light beam on the work W always coincides with the light receiving axis of the camera 216 irrespective of the scanning in the XY direction by the scanning part 215, and the camera 216 can photograph the image of the surface of the work W including the condensing position of the laser light beam L.

The camera 216 merely needs to be able to photograph at least one part of the work W, and does not need to be able to simultaneously photograph the entire work W and also does not need to be able to simultaneously photograph the entire scanning region of the laser light beam L. Furthermore, it is desirable to arrange a zoom lens in the camera 216, so that the work W is photographed at a magnification specified by the user, and an enlarged image is output. Furthermore, the camera 216 may be a still camera for generating a still image as necessary, but is more desirably a video camera for generating a moving image by periodically performing photographing.

The marker controller 22 is configured by an exciting light generating part 221, a power supply 222, a control part 223, and a symbol combining part 224. The exciting light generating part 221 is supplied with driving voltage from the power supply 222, and generates a laser exciting light beam. The laser exciting light beam is sent to the laser oscillation part 211 of the marker head 21 through an optical fiber cable. The control part 223 controls the exciting light generating part 221, as well as the laser oscillation part 211, the beam expander 212, the scanning part 215, and the camera 216 of the marker head 21 based on control data from the processed data generating device 1. The symbol combining part 224 combines a symbol indicating the position of the light receiving axis of the camera 216 to the photographed image photographed by the camera 216 of the marker head 21, and outputs a combined image to the photographed image monitor 3.

Figure 3:
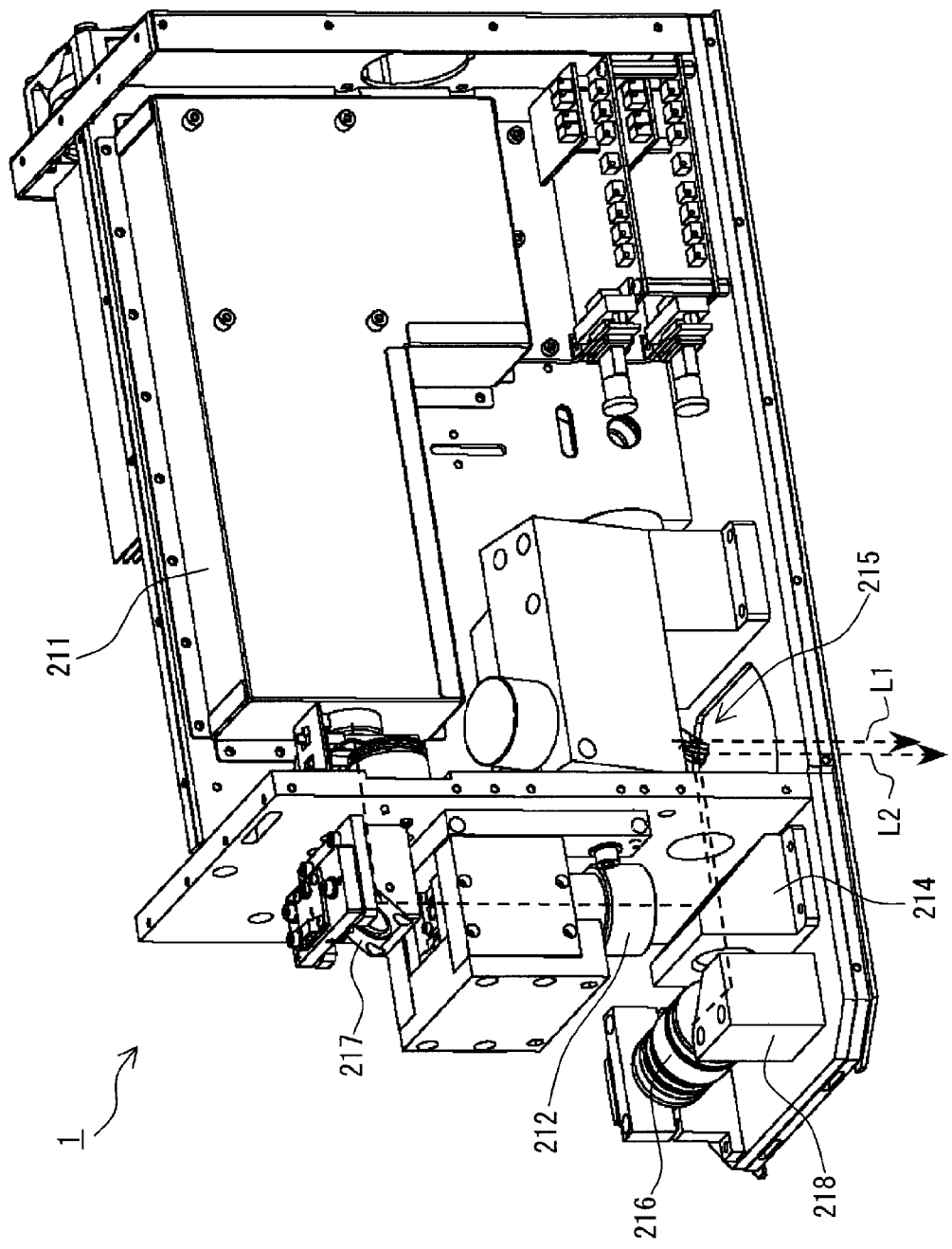
FIG. 3 is a perspective view showing an internal configuration of the marker head 21.

FIG. 3 is a perspective view showing an internal configuration of the marker head 21. In the figure, the laser oscillation part 211, the beam expander 212, the half mirror 214, the scanning part 215, and the camera 216 of FIG. 2 are shown, and fixed mirrors 217 and 218 are also shown. The condenser part 213 of FIG. 2 is integrally incorporated with the beam expander 212.

The laser light beam emitted from the laser oscillation part 211 is reflected at 90° by the fixed mirror 217 and entered to the beam expander 212, and after a beam diameter is adjusted in the beam expander 212, the light is reflected at 90° by the half mirror 214 and entered to the scanning part 215. The laser light beam entered to the scanning part 215 is reflected in order by the pair of galvanometer mirrors, and the work W is irradiated with this laser light beam.

The camera 216, on the other hand, has the light receiving axis thereof reflected by the fixed mirror 218 thereby reaching the half mirror 214, where the light receiving axis transmitted through the half mirror merges with the optical path of the laser light beam so as to be coaxial with the optical axis of the laser light beam reflected by the half mirror 214. Therefore, if the pair of galvanometer mirrors are respectively turned and the optical axis of the laser light beam is two-dimensionally scanned, the light receiving axis of the camera 216 is similarly two-dimensionally scanned, whereby the optical axis of the laser light beam and the light receiving axis of the camera 216 are maintained coaxially.

(Photographed Image Monitor 3)

Figure 4:
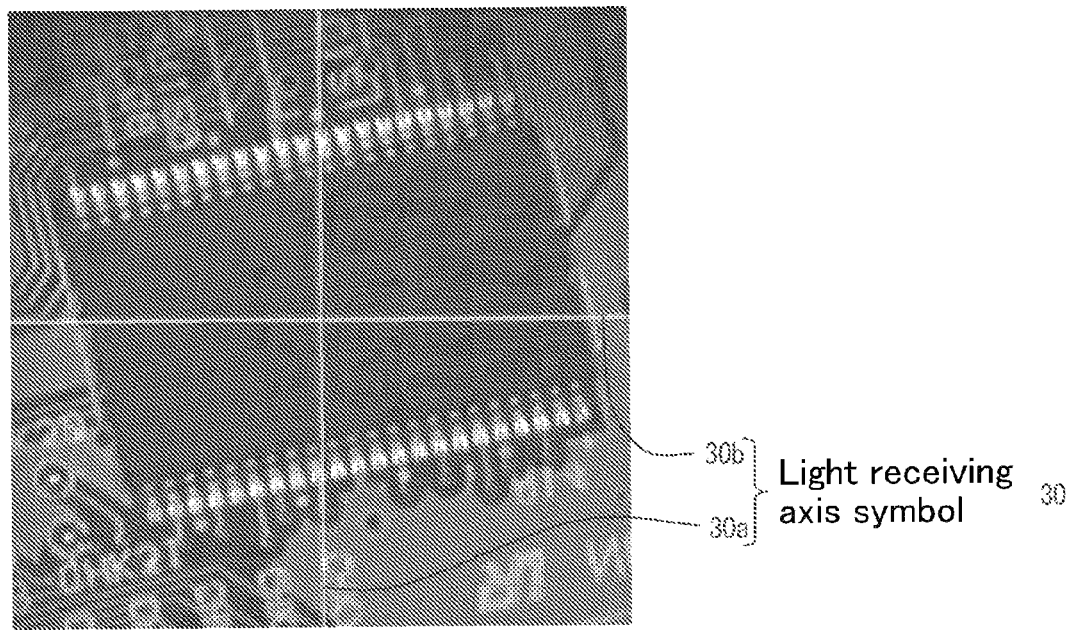
FIG. 4 is a view showing one example of a photographed image displayed on a photographed image monitor 3.

FIG. 4 is a view showing one example of a photographed image displayed on the photographed image monitor 3. A photographed image of the camera 216 of the laser marker 2, and a light receiving axis symbol 30 displaying the light receiving axis of the camera 216 are displayed on the photographed image monitor 3. Here, a cross symbol including two orthogonal lines 30a, 30b is superimposed and displayed on the photographed image, and an intersection of the cross symbols positioned at the middle of the photographed image shows the position of the light receiving axis of the camera 216. The position of the light receiving axis is desirably at substantially the middle of the photographed image, but merely needs to exist in the photographed image and does not necessarily need to be at the middle.

(Setting Screen 10 of Processed Data Generating Device 1)

Figure 5:
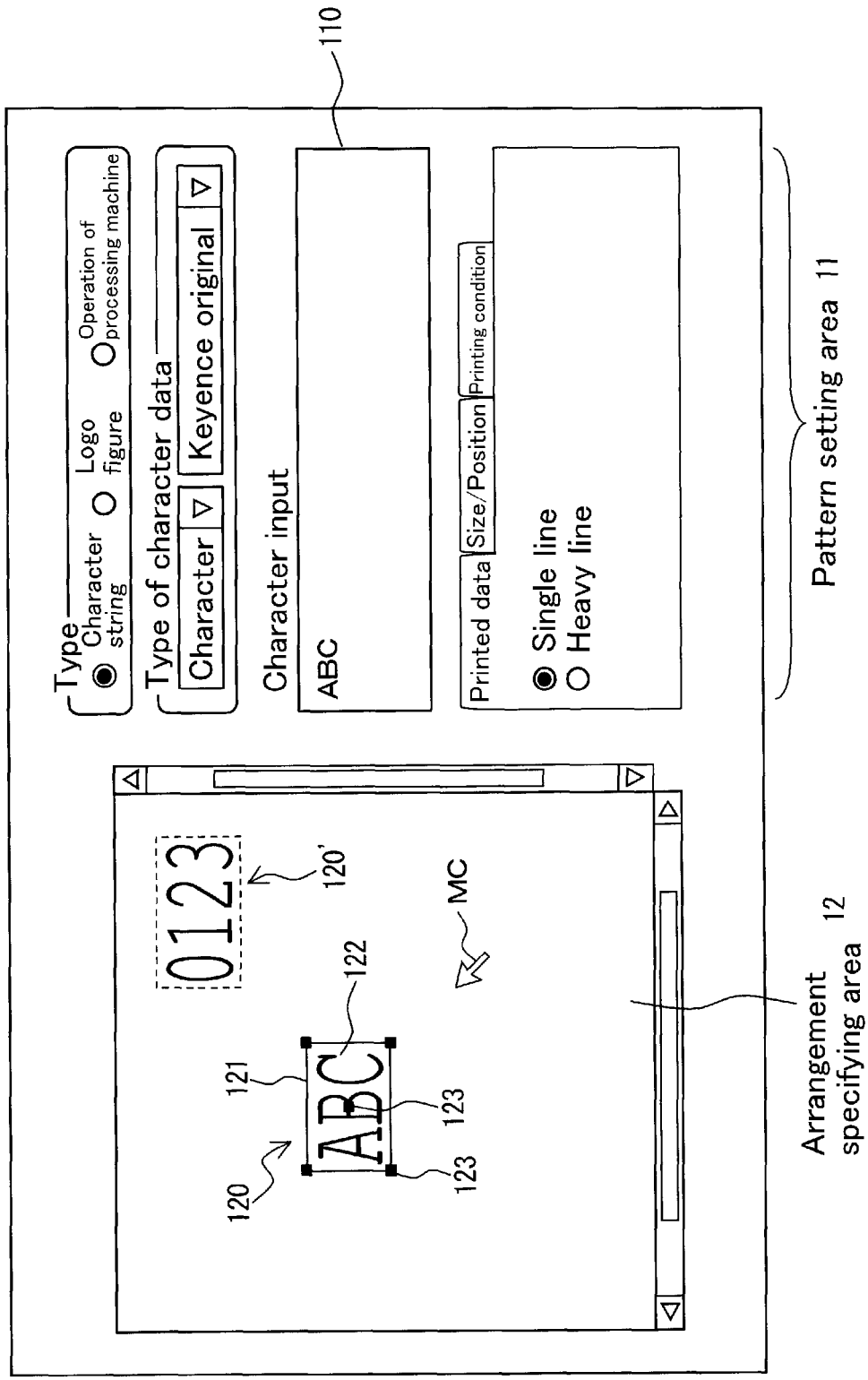
FIG. 5 is a view showing one example of a setting screen 10 displayed by a processed data generating device 1.

FIG. 5 is a view showing one example of a setting screen 10 displayed by the processed data generating device 1. The setting screen 10 includes a pattern specifying area 11 and an arrangement specifying area 12. The user operates a mouse or a keyboard while looking at the setting screen 10 to specify the processing information. The processing information includes a processing pattern, and a position and a tilt in the scanning region of the processing pattern. The processed data generating device 1 generates control data of the scanning part 215 based on such processing information, and sends the processed data including the control data to the laser marker 2 prior to laser processing.

The pattern specifying area 11 is a screen region for the user to specify the processing pattern. The processing pattern is information of a shape drawn by a trajectory of the laser light beam L. In the present embodiment, assume the two-dimensional pattern on the XY plane is specified as the processing pattern. In the figure, a state in which the character is selected as the type of processing pattern is shown. In this case, the user clicks and selects a character input field 110, and inputs a character string such as "ABC" to the character input field 110 to specify the processing pattern including the character string.

The arrangement specifying area 12 is a screen region for specifying the arrangement of the processing pattern on the work W, and is arranged on a left side of the setting screen 10. A setting plane is displayed in the arrangement specifying area 12, and the user can arbitrarily arrange a processing object 120 representing the processing pattern "ABC" using the mouse and the like. In the present embodiment, assume that the processing object 120 can be arranged at an arbitrary tilt at an arbitrary position on the setting plane. The control data of the scanning part 215 that becomes necessary in laser processing can be generated by determining the position and the tilt of the processing object 120 on the setting plane in the above manner.

Two or more processing objects 120 can be arranged in the arrangement specifying area 12. If two or more processing objects 120 are arranged, one of such processing objects 120 is a target of editing, and a selection thereof is made by a clicking operation of the processing object 120 by the user. The processing object 120 to be edited and a processing object 120' not to be edited are shown in the illustrated arrangement specifying area 12.

The setting plane is a plane corresponding to the two-dimensional scanning region (scanning plane) of the laser light beam L, and corresponds to the two-dimensional plane when the work W is seen from the marker head 21 side. That is, the setting plane defined as an orthogonal coordinate have the X direction and the Y direction of the marker head 21 as coordinate axes is displayed in the arrangement specifying area 12, and the arbitrary position in the setting screen is corresponded one on one to the position in the scanning plane of the scanning part 215. The user is unable to know to which position on the work W corresponds to each position on the setting plane merely by looking at the arrangement specifying area 12.

The processing object 120 is configured by a processing region 121, a processing pattern 122, and a reference handle 123. The processing region 121 is a symbol showing the position and the tilt of the processing pattern 122 in the setting plane, and the processing pattern 122 is arranged on the setting plane with the processing region as a reference. In the figure, a case where a rectangular shape is displayed as the processing region 121 and the processing pattern 122 is displayed in the rectangular region is shown by way of example, but the processing region 121 is not limited to the rectangular shape, and the processing pattern 122 merely needs to be arranged with the processing region 121 as a reference and does not need to be arranged in the processing region 121.

The reference handle 123 is a symbol arranged at feature points of the processing region 121, where two or more reference handles 123 are arranged with respect to one processing region 121. The user can align a mouse cursor MC on one of the reference handles 123 and click the mouse cursor MC to select the relevant reference handle 123 as a reference point. In the figure, an example where the reference handle 123 is arranged for four vertices of the rectangular shape and an intersection of the diagonal lines, and a total of five reference handles 123 are arranged in one processing region 121 is shown.

When the user selects one of the reference handles 123 as the reference point, the control data is output from the processed data generating device 1 to the laser marker 2, and the scanning part 215 of the laser marker 2 coincides the laser optical axis to the position in the scanning region corresponding to the reference point. Thereafter, the scanning part 215 performs scanning control in real time so that the selected reference point and the laser optical axis constantly coincide. That is, when the user moves the processing region 121 on the setting plane with a certain reference handle 123 selected as the reference point, changes the tilt, or selects a different reference handle 123 as a new reference point, the scanning part 215 moves the laser optical axis, and always cooperatively operates the reference point and the laser optical axis according to such operations.

For instance, when the user moves the processing object 120 in the X direction (Y direction) in the arrangement specifying area 12 after selecting the reference point, the laser optical axis also moves in the X direction (Y direction) in the scanning region. Thus, the image displayed on the photographed image monitor 3 also becomes the photographed image of when the light receiving axis is moved in the X direction (Y direction). The photographed image of the work W can be viewed on the photographed image monitor 3 with the laser optical axis coincided to the position in the scanning region corresponding to the reference point by specifying the reference point in the arrangement specifying area 12 in such manner.

Here, the user can check the position on the work W at where the laser light beam is condensed by the position pointed out by the light receiving axis symbol 30 on the photographed image. That is, the position on the work W corresponding to the position (reference point) of the setting plane in the processed data generating device 1 can be checked by the photographed image displayed on the photographed image monitor 3. The processing pattern can be arranged at a desired tilt at the desired position of the work W by moving the processing object 120 or changing the tilt thereof while looking at the photographed image monitor 3. Furthermore, the processing position can be specified at high precision on the work W compared to the conventional laser processing apparatus in which the work W is visually checked by displaying an enlarged image of the work W on the photographed image monitor 3.

(Positional Adjustment Using Photographed Image Monitor 3)

Figure 6:
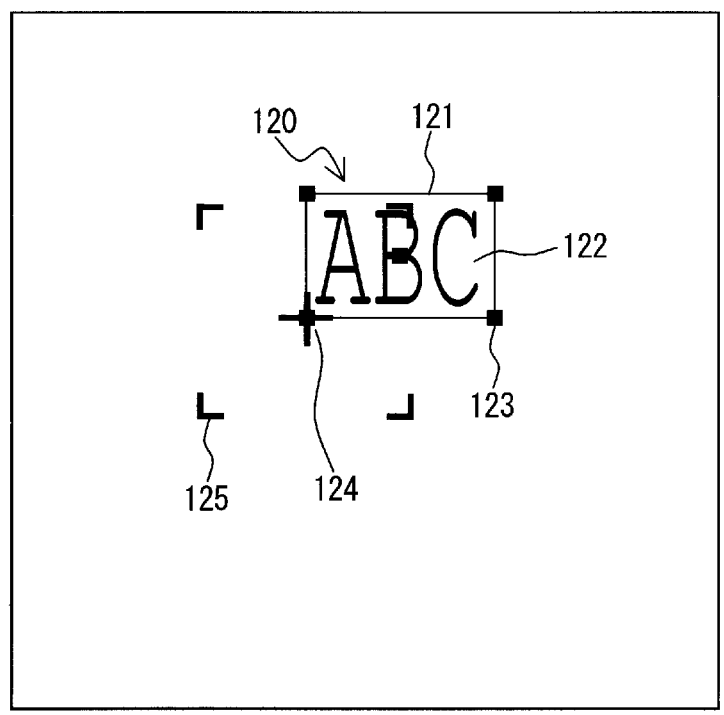
FIG. 6 shows a display example in an arrangement specifying area 12 when a reference point for position adjustment is selected.

FIG. 6 shows a display example in the arrangement specifying area 12 when the reference point for position adjustment is selected. When the reference handle 123 is selected as the reference point 124, it is selected as the reference point 124 of either for position adjustment or for tilt adjustment. If specified as the reference point 124 for position adjustment, the processing object 120 can be displaced in parallel in the setting plane. If specified as the reference point 124 for tilt adjustment, the processing object 120 can be rotated in the setting plane with a predetermined rotation axis as a center.

In the figure, a case where the user selects the reference handle 123 at a lower left vertex of the processing object 120 as the reference point 124 for position adjustment in the arrangement specifying area 12 is shown. In this case, a photographed region symbol 125 representing a rectangular region with the reference point 124 as the center is displayed in the arrangement specifying area 12. The photographed region symbol 125 is photographed by the camera 216, and represents the region on the work W to be displayed on the photographed image monitor 3 on the setting plane.

In this state, the user can displace in parallel the processing object 120 on the setting plane by dragging the processing object 120 using the mouse. In other words, only the position can be changed while maintaining the tilt constant. If the processing object 120 is moved on the setting plane in the above manner, the photographed region symbol 125 is also moved according thereto, and the photographed image displayed on the photographed image monitor 3 also becomes an image photographed with the light receiving axis of the camera 216 moved on the work W in accordance with the movement of the symbol.

Figure 7:
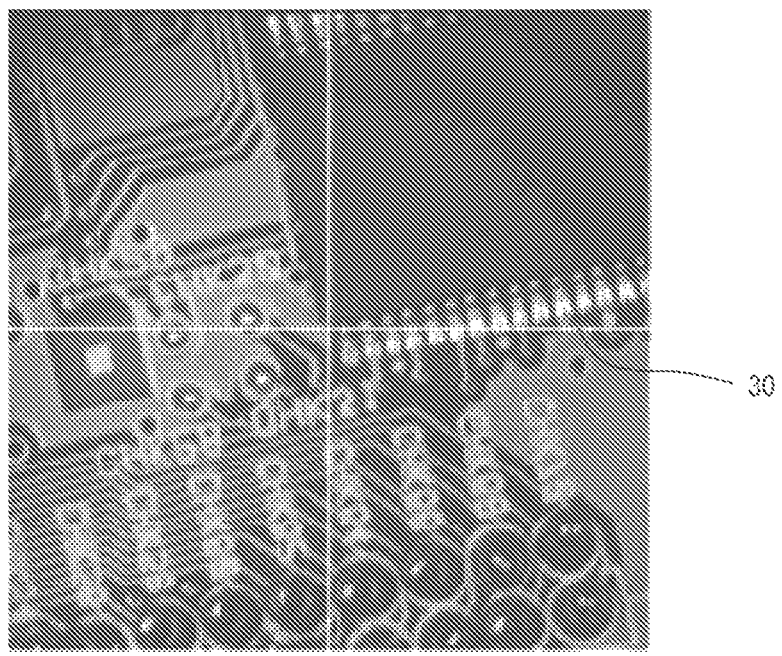
FIG. 7 is a view showing a display example of the photographed image monitor 3 in a case of FIG. 6.

FIG. 7 is a view showing a display example of the photographed image monitor 3 in a case of FIG. 6. If the reference point 124 for position adjustment is selected in the processed data generating device 1, an image of the work W corresponding to the region on the setting plane indicated by the photographed region symbol 125 of FIG. 6 is displayed on the photographed image monitor 3. The user can coincide the light receiving axis to the desired position of the work W on the photographed image by moving the processing object 120 on the setting plane while looking at the photographed image monitor 3. As a result, the reference point can be moved to the position on the setting plane corresponding to the desired position of the work W.

In this figure, a print substrate mounted with a semiconductor device is assumed as the work W, and the photographed image of the work W photographed with the camera 216 is displayed. A state in which the user coincides the light receiving axis indicated with the light receiving axis symbol 30 to the vicinity of the lower left vertex of a package of the semiconductor device is shown.

The light receiving axis of the camera 216 is always coincided with the laser optical axis on the work W, and thus it can be seen that the position of the reference point on the setting plane corresponds to the lower left vertex of the package of the semiconductor device. The user can thus find the position on the setting plane corresponding to the arbitrary position on the work W by simply moving the processing object 120 on the setting plane while looking at the photographed image monitor 3, and thus the position adjustment of the processing object 120 can be rapidly and easily performed. Furthermore, if the photographed image is an enlarged image, adjustment can be made at high precision.

(Tilt Adjustment Using Photographed Image Monitor 3)

Figure 8:
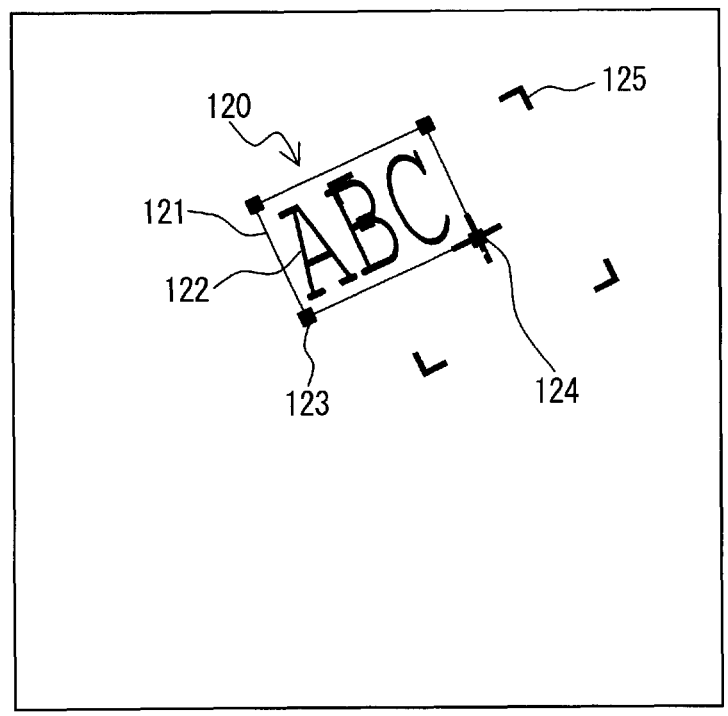
FIG. 8 shows a display example in the arrangement specifying area 12 when the reference point for tilt adjustment is selected.

FIG. 8 shows a display example in the arrangement specifying area 12 when the reference point for tilt adjustment is selected. In the figure, a case where the user selects the reference handle 123 at a lower right vertex of the processing object 120 as the reference point 124 for tilt adjustment in the arrangement specifying area 12 is shown.

In this case, the user can rotate but cannot displace in parallel the processing object 120 in the setting plane by dragging the processing object 120 using the mouse. Excluding such aspect, the operation of the processed data generating device 1 is exactly the same as when the reference point for position adjustment is selected. The center of rotation is an arbitrary point other than the reference point for tilt adjustment such as a center of gravity of the processing object 120 to be rotated. In this example, the processing object 120 can be rotated with the reference point for position adjustment specified immediately before, that is, the lower left vertex of the processing object as the center of rotation.

Figure 9:
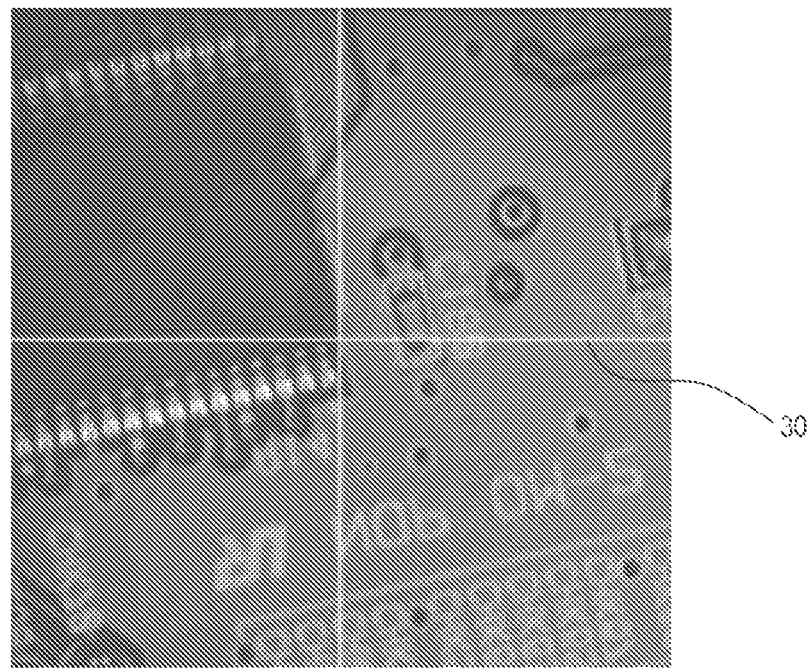
FIG. 9 is a view showing a display example of the photographed image monitor 3 in a case of FIG. 8.

FIG. 9 is a view showing a display example of the photographed image monitor 3 in a case of FIG. 8. If the reference point 124 for tilt adjustment is selected in the processed data generating device 1, an image of the work W corresponding to the region on the setting plane indicated with the photographed region symbol 125 of FIG. 8 is displayed on the photographed image monitor 3, similar to when the reference point for position adjustment is selected (FIG. 7). The user rotates the processing object 120 on the setting plane while looking at the photographed image monitor 3 to adjust the tilt of the processing object 120 on the setting plane while checking the position relationship on the work W.

Here, the position of the light receiving axis on the photographed screen is the position corresponding to the reference point for tilt adjustment on the setting plane, but the light receiving axis may be freely moved on the photographed screen in response to the mouse operation of the user. In this case, the movement direction of the light receiving axis is reflected on the processing object 120 as the tilt and the movement distance is not reflected.

The figure shows a case where the user performs the mouse operation to coincide the light receiving axis to the vicinity of the lower right vertex of the package of the semiconductor device on the photographed screen. As a result, the processing object 120 can be tilted on the setting plane so that the lower side of the processing object 120 becomes parallel to the lower side of the package.

The user then can rapidly and easily perform tilt adjustment of the processing object 120 since the tilt on the setting plane corresponding to the arbitrary tilt on the work W can be found by simply rotating the processing object 120 on the setting plane while looking at the photographed image monitor 3. Furthermore, adjustment can be performed at high precision if the photographed image is an enlarged image.

Figure 10:
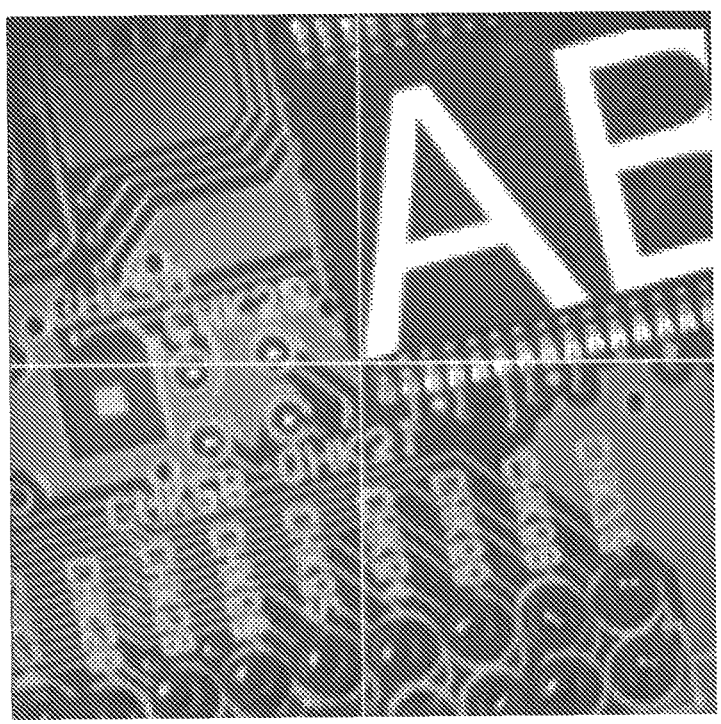
FIG. 10 shows a result of performing laser processing after position adjustment and tilt adjustment of a processing pattern shown in FIGS. 6 to 9.

FIG. 10 shows a result of performing laser processing after position adjustment and tilt adjustment of the processing pattern shown in FIGS. 6 to 9. The work W is subjected to the laser processing as when position adjustment and tilt adjustment are performed. That is, through the use of the laser processing apparatus 100 according to the present embodiment the position and the tilt on the work W of the processing pattern can be accurately specified by simply operating the processed data generating device 1 while looking at the photographed image monitor 3.

(Configuration of Processed Data Generating Device 1)

Figure 11:
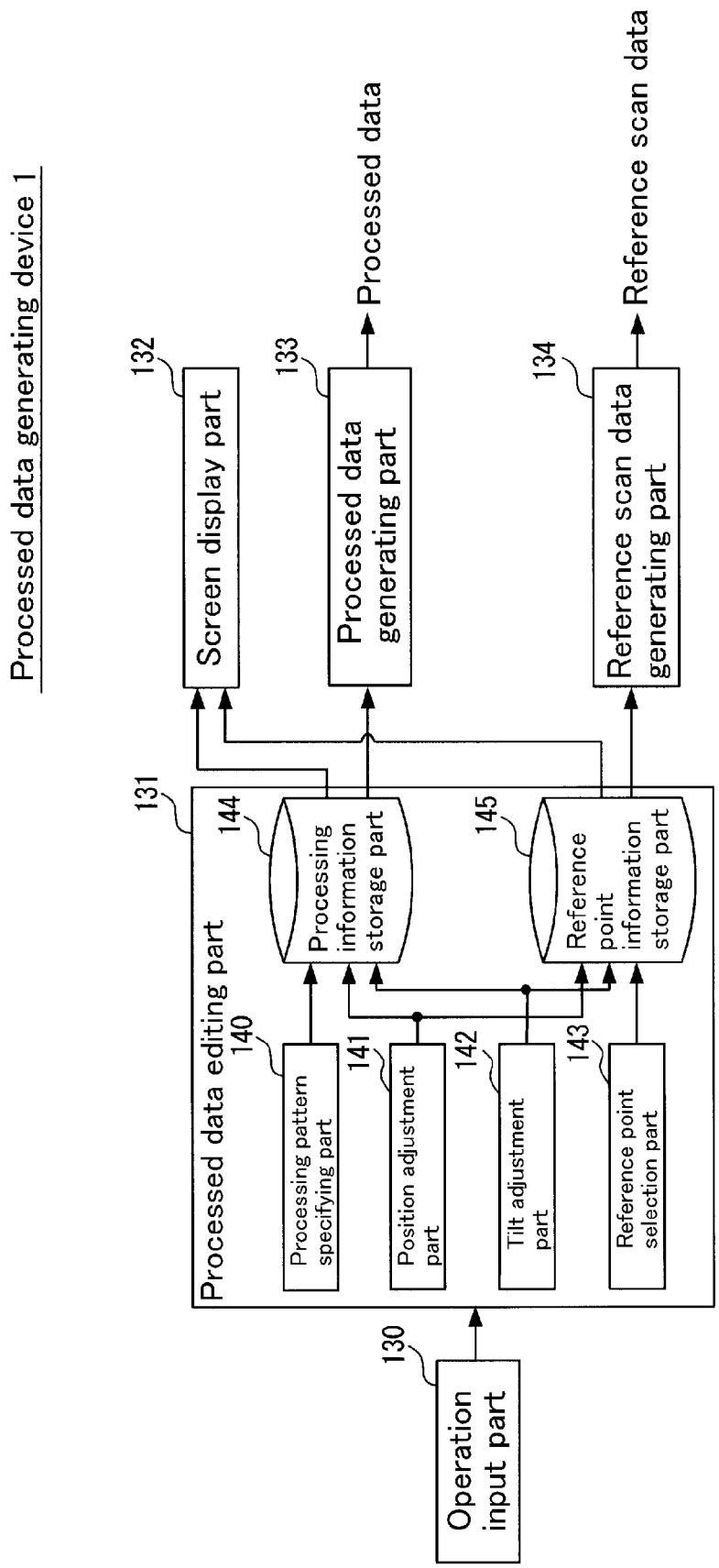
FIG. 11 is a block diagram showing one configuration example on main parts of the processed data generating device 1.

FIG. 11 is a block diagram showing one configuration example on main parts of the processed data generating device 1. The processed data generating device 1 is configured by an operation input part 130, a processed data editing part 131, a screen display part 132, a processed data generating part 133, and a reference scan data generating part 134. The processed data generating device 1 is a device for generating the processed data based on user operation, and transmitting the processed data to the marker controller 22 prior to laser processing. In addition thereto, the processed data generating device 1 according to the present embodiment transmits to the marker controller 22 the reference scan data for coinciding the laser optical axis to the reference point specified by the user during editing of the processed data.

The operation input part 130 is an operation input section including a keyboard, a mouse, or the like. The user specifies various information for generating the processed data by performing operations such as selection of menu on the setting screen 10, input of characters to the input field, selection and drag of the object, and the like using the operation input part 130.

The screen display part 132 is a display device for displaying the setting screen 10 of FIG. 5, and a CRT, a liquid crystal display device, and the like are used. The setting screen 10 is generated based on the processing information in a processing information storage part 144 and reference point information in a reference point information storage part 145.

The processed data generating part 133 generates the processed data based on the processing information in the processing information storage part 144, and sends the processed data to the marker controller 22. The processed data is control data specifying the processing content by the laser marker 2, and includes scan data for controlling the scanning part 215. The processed data is sent to the marker controller 22 after the completion of editing of the processed data and before the start of laser processing by the laser marker 2.

The reference scan data generating part 134 generates the scan data based on the reference point information in the reference point information storage part 145, and sends the scan data to the marker controller 22 as the reference scan data. The reference scan data is scan data for controlling the scanning part 215 so as to coincide the laser optical axis to the reference point to perform position adjustment or tilt adjustment of the processing pattern. The reference scan data is repeatedly sent to the marker controller 22 during editing of the processing pattern or during the period the reference point is selected. The period of sending is desirably a short period to an extent that the scanning part 215 can follow the movement of the reference point 124 in real time.

The processed data generating part 133 and the reference scan data generating part 134 both perform a process of converting the position on the setting plane to the position in the scanning region, where the same position on the setting plane is converted to the same position in the scanning region regardless of with which it is converted.

The processed data editing part 131 is a processing part for creating and editing the processed data, and includes a processing pattern specifying part 140, a position adjustment part 141, a tilt adjustment part 142, a reference point selection part 143, a processing information storage part 144, and a reference point information storage part 145. The processed data editing part 131 not only generates the processed data, but performs display control of the screen display part 132 for displaying the setting screen 10 during editing of the processed data.

The processing pattern specifying part 140 is a processing part for specifying the shape drawn by the trajectory of the laser light beam as the processing pattern, and specifies the processing pattern based on the user operation with respect to the pattern specifying area 11 of the setting screen 10, and stores the processing pattern in the processing information storage part 144.

The reference point selection part 143 is a processing part for specifying the reference point, and selects the reference handle 123 as the reference point 124 based on the user operation of selecting one of the reference handles 123 in the arrangement specifying area 12 of the setting screen 10. When a new reference point is selected, the position information of the new reference point is stored in the reference point information storage part 145.

The position adjustment part 141 is a processing part for adjusting the position of the processing pattern, and performs a process of displacing in parallel the processing object 120 on the setting plane based on the user operation when the reference point for position adjustment is selected. The position information of the processing pattern after movement is stored in the processing information storage part 144. The position information of the reference point 124 moved with the movement of the processing object 120 is stored in the reference point information storage part 145.

The tilt adjustment part 142 is a processing part for adjusting the tilt of the processing pattern, and performs a process of rotating the processing object 120 on the setting plane based on the user operation when the reference point for tilt adjustment is selected. The tilt information of the processing pattern after rotation is stored in the processing information storage part 144. The position information of the reference point 124 moved with the rotation of the processing object 120 is stored in the reference point information storage part 145.

The processing information storage part 144 is a storage section for storing the processing pattern and the processing information necessary for generating the processed data of position, tilt, and the like of the processing pattern. The reference point information storage part 145 is a storage section for storing the position on the setting plane of the reference point being selected by the user.

In the laser processing apparatus 100 according to the present embodiment, the reference point 124 of the processing object 120 arranged on the setting plane is selected by the user, and the scanning part 215 of the laser marker 2 is controlled so as to coincide the laser optical axis to the position in the scanning region corresponding to the reference point 124. The light receiving axis of the camera 216 coincides with the laser optical axis, and the photographed image is displayed on the photographed image monitor 3 with the light receiving axis symbol 30 indicating the position of the light receiving axis.

Through the use of such laser processing apparatus 100, the position on the work W corresponding to the reference point 124 on the setting plane can be accurately understood as the position of the light receiving axis on the photographed image. Thus, the processed data for forming the processing pattern with a desired tilt at the desired position on the work W can be easily and rapidly generated by moving or rotating the processing object 120 on the setting plane while looking at the photographed image monitor 3.

Furthermore, the position and the tilt of the processing pattern can be adjusted at high precision that could not be realized in the adjustment task by visual check of the work W of the conventional art by displaying at least one part of the work W in an enlarged manner on the photographed image monitor 3.

Second Embodiment

In the first embodiment, an example where the coordinate system defining the setting plane of the processed data generating device 1 coincides with the coordinate system defining the scanning region of the laser marker 2 has been described. In the present embodiment, a case where the coordinate system of the setting plane of the processed data generating device 1 and the coordinate system of the scanning region of the laser marker 2 differ, and a coordinate system conversion process including rotation or mirror-imaging will be described.

Figure 12A:
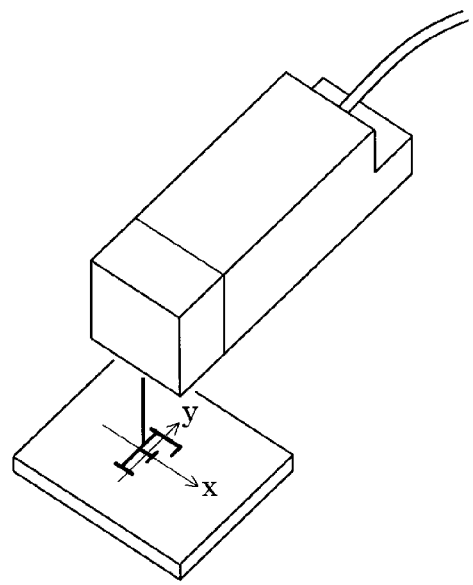
FIGS. 12A and 12B are explanatory views showing general coordinate systems of a setting plane and a scanning region.
Figure 12B:
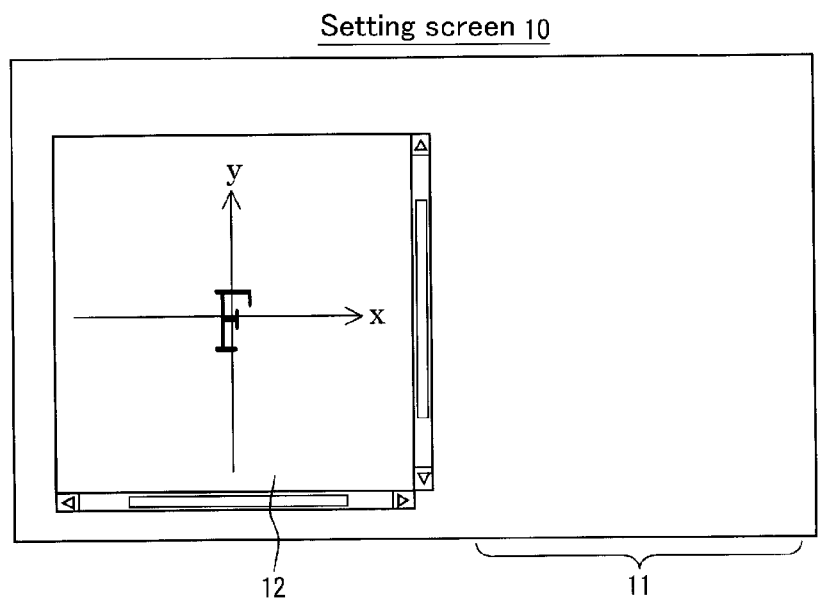

FIG. 12 is an explanatory view showing one example of coordinate systems of the setting plane and the scanning region, where the coordinate system of the scanning region is shown in (a) of the figure, and the coordinate system of the setting plane displayed on the setting screen 10 is shown in (b). The setting plane and the scanning region are expressed with an orthogonal coordinate in which two axes of the X axis corresponding to the X direction and the Y axis corresponding to the Y direction are orthogonal to each other. The setting plane and the scanning region are associated to each other so as to obtain a coordinate system in which the setting plane displayed on the processed data generating device 1 completely coincides with the scanning region of when the work W is seen from the marker head 21 so that the user can understand easily and intuitively.

However, the user can understand more easily and intuitively and the task of creating the processed data may be more efficient if the coordinate system of the scanning region is a coordinate system obtained by rotating or mirror-imaging the coordinate system of the setting plane. For instance, even when printing the characters rotated on the work W, a creating efficiency may be higher if non-rotated characters are displayed as the processing pattern on the setting screen 10.

Furthermore, when forming a die by laser processing or when printing a pattern on the back surface (surface on the side opposite to the visually recognizing side) of a transparent body, the creating efficiency may be sometimes higher if a non-mirror-imaged processing pattern is displayed on the setting screen 10.

If the coordinate systems of the setting plane and the scanning region are different, the coordinate system conversion from the setting plane to the scanning region needs to be performed on the control data of the scanning part 215 generated in the processed data generating device 1 and sent to the laser marker 2.

(Coordinate System Conversion Parts 135, 136)

Figure 13:
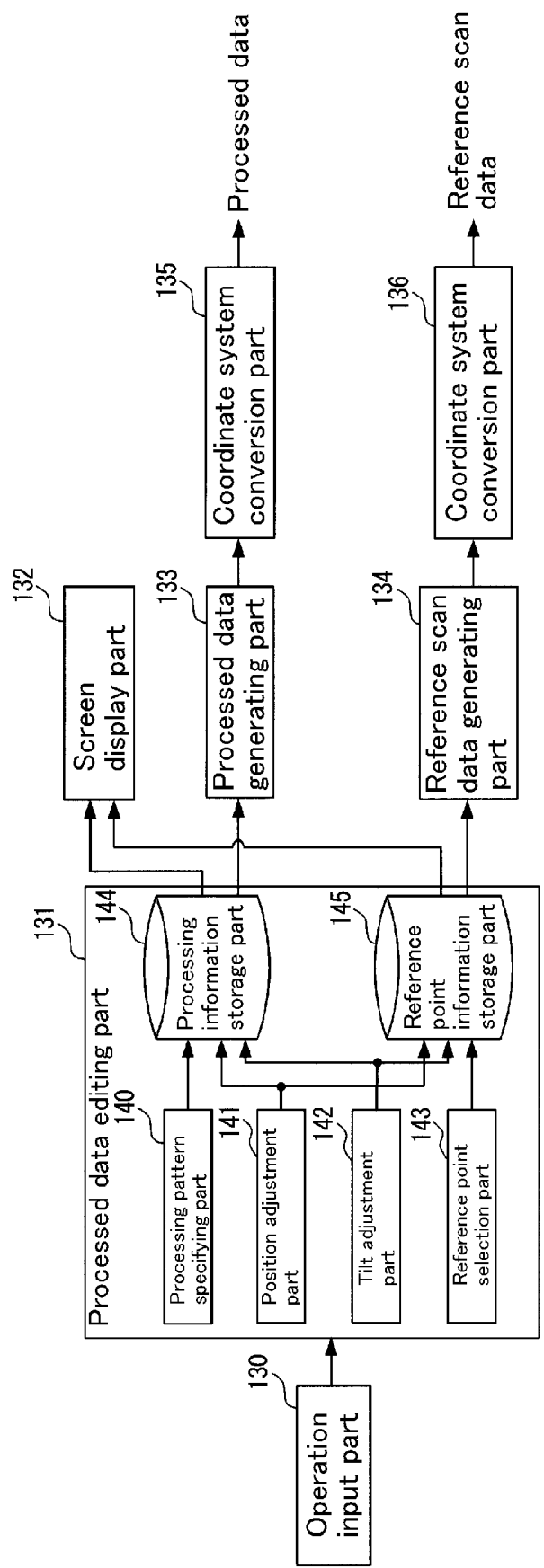
FIG. 13 is a block diagram showing one configuration example of the main parts of the processed data generating device 1 configuring the laser processing apparatus 100 according to a second embodiment.
Figure 14A:
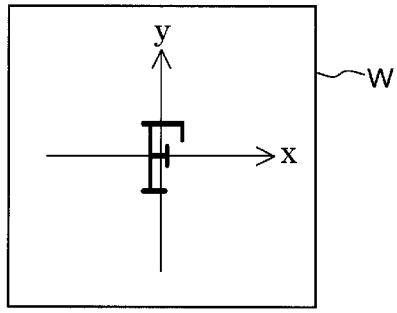
FIGS. 14A-14H are explanatory views showing one example of a coordinate system conversion process by coordinate system conversion parts 135, 136 of FIG. 13.
Figure 14E:
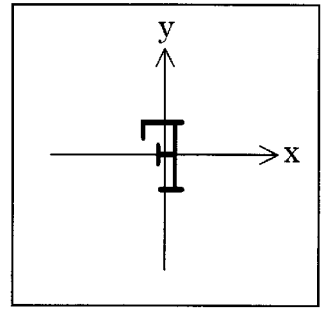
Figure 14B:
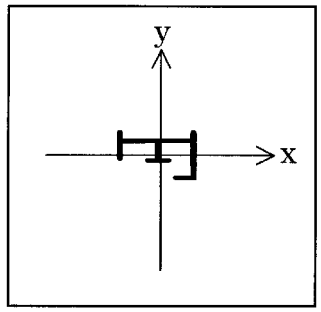
Figure 14F:
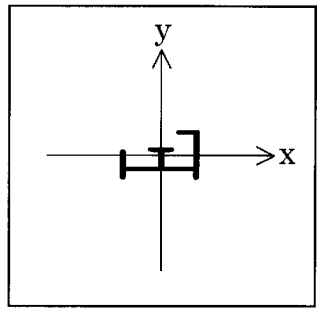
Figure 14C:
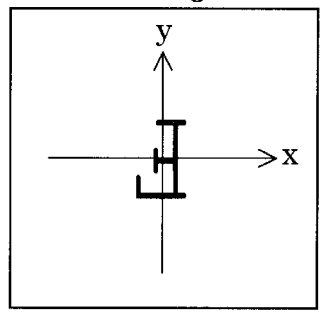
Figure 14G:
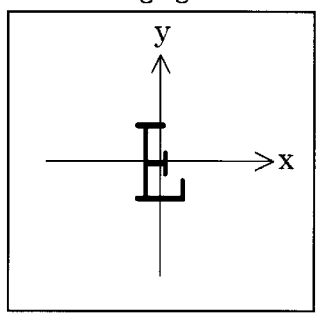
Figure 14D:
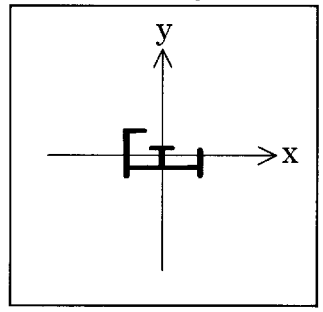
Figure 14H:
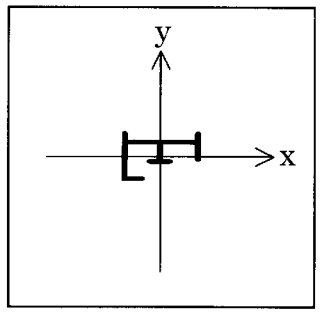

FIG. 13 is a block diagram showing one configuration example of main parts of the processed data generating device 1 configuring the laser processing apparatus 100 according to a second embodiment. Compared to the device of FIG. 11 (first embodiment), the processed data generating device 1 differs in that the coordinate system conversion parts 135 and 136 are included. The basic configuration of the laser processing apparatus 100 and other configurations of the processed data generating device 1 are similar to the first embodiment, and thus redundant description will not be described.

The coordinate system conversion part 135 performs a coordinate system conversion specified by the user on the processed data generated by the processed data generating part 133, and sends the same to the marker controller 22. The coordinate system conversion part 136 performs a coordinate system conversion specified by the user on the reference scan data generated by the reference scan data generating part 134, and sends the same to the marker controller 22. The processes performed by the coordinate system conversion parts 135 and 136 are the same coordinate system conversion process but on different processing targets.

FIG. 14 is an explanatory view showing one example of a coordinate system conversion process by the coordinate system conversion parts 135, 136 of FIG. 13. The processing pattern "F" of when the coordinate system conversion is not performed is shown in (a) of the figure, and the processing pattern after the coordinate system conversion is shown in (b) to (h). That is, the coordinate system conversion parts 135, 136 generate one of the processing information of (a) to (h) based on the processing information of (a).

The coordinate system conversion executed in the coordinate system conversion parts 135, 136 includes either one or a combination of a mirror-imaging process and a rotation process. The mirror-imaging process is a process of inverting with respect to the Y axis. The rotation process is a process of rotating to the right at 90 degrees×n (n is an integer of 1 to 3) with the coordinate origin as the center. That is, one of a total of eight conversion processes including non-conversion is performed in the coordinate system conversion parts 135, 136.

The results of rotating the processing pattern "F" to the right by 90 degrees, 180 degrees, and 270 degrees are shown in (b) to (d) of the figure. The result of mirror-imaging the processing pattern "F" of (a) with respect to the Y axis is shown in (e) of the figure. The results of rotating the mirror-imaged processing pattern of (e) further to the right by 90 degrees, 180 degrees, and 270 degrees are shown in (f) to (h) of the figure.

When such coordinate system conversion is performed in the processed data generating device 1, the movement direction of the reference point 124 in the setting screen 10 does not coincide with the movement direction of the light receiving axis displayed on the photographed image monitor 3, and it becomes difficult for the user to understand intuitively. For instance, when the coordinate system conversion part 136 is performing the right rotation process of 90 degrees shown in FIG. 14(*b*), the light receiving axis is moved upward in the photographed image monitor 3 if the processing object 120 is moved to the left in the arrangement specifying area 12. When performing the mirror-imaging process shown in FIG. 14(*e*), the light receiving axis is moved to the right in the photographed image monitor 3 if the processing object 120 is moved to the left. Under such circumstances, the tasks of position adjustment and tilt adjustment become difficult.

In the laser processing apparatus 100 of the present embodiment, the workability of position adjustment and tilt adjustment is enhanced by performing coordinate conversion similar to the coordinate system conversion parts 135, 136 on the photographed image, and displaying the converted image on the photographed image monitor 3.

(Coordinate System Conversion Part 225)

Figure 15:
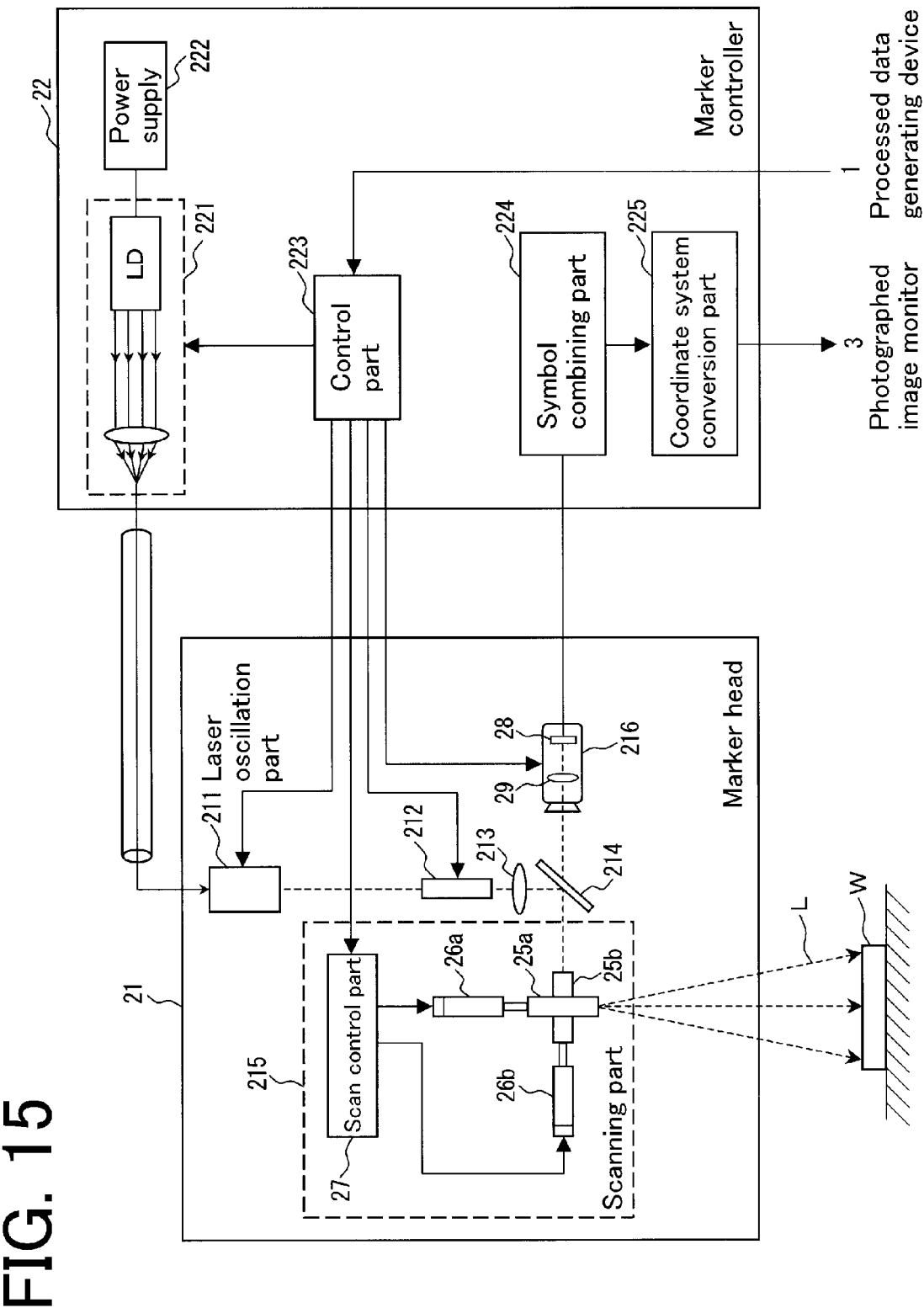
FIG. 15 is a block diagram showing one configuration example of the laser marker 2 configuring the laser processing apparatus 100 according to the second embodiment.
Figure 16A:
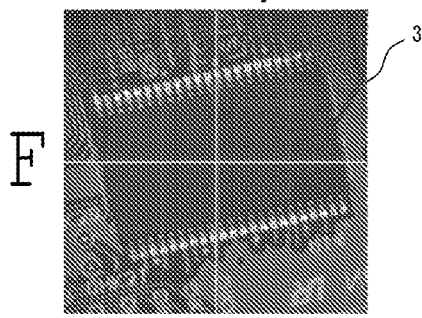
FIGS. 16A-16H show examples of the coordinate system conversion process by a coordinate system conversion part 225 of FIG. 15.
Figure 16E:
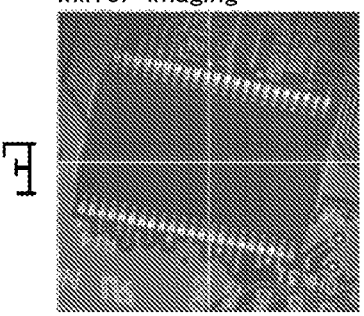
Figure 16B:
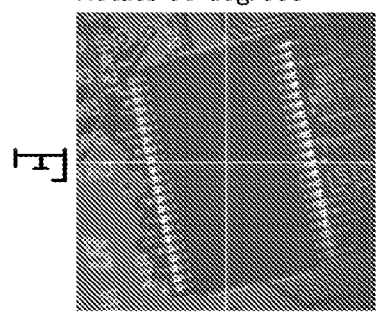
Figure 16F:
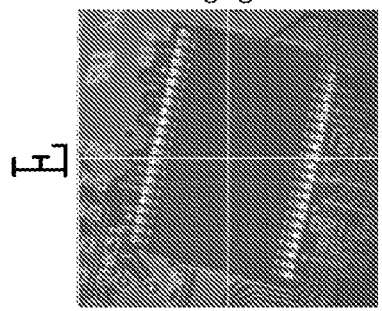
Figure 16C:
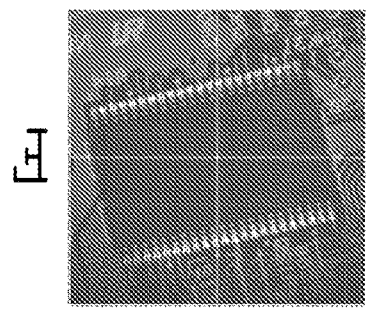
Figure 16G:
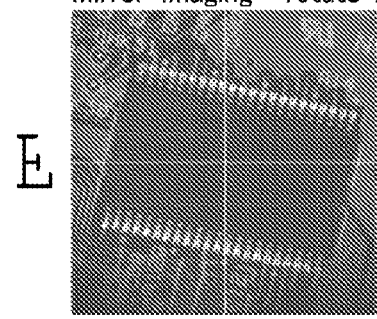
Figure 16D:
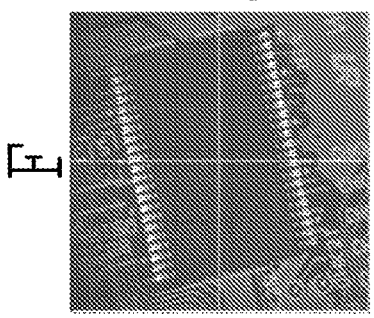
Figure 16H:
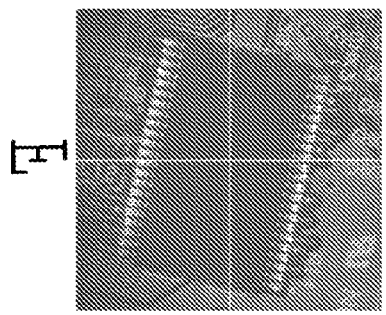

FIG. 15 is a block diagram showing one configuration example of the laser marker 2 configuring the laser processing apparatus 100 according to the second embodiment. This laser processing apparatus 100 differs from the apparatus of FIG. 2 (first embodiment) in that the marker controller 22 includes a coordinate system conversion part 225. Other configurations are the same as the first embodiment.

The coordinate system conversion part 225 performs coordinate system conversion of rotating or mirror-imaging the photographed image. The coordinate system conversion process is a process corresponding to the coordinate system conversion process performed by the coordinate system conversion part 136 of the processed data generating device 1. For instance, when the coordinate system conversion part 136 is performing the right rotation process of 90 degrees shown in FIG. 14(*b*), the coordinate system conversion part 225 also rotates the photographed image to the right by 90 degrees. When the coordinate system conversion part 136 is performing the mirror-imaging process shown in FIG. 14(*e*), the coordinate system conversion part 225 also mirror-images the photographed image with respect to the Y axis. The photographed image converted in such manner is displayed on the photographed image monitor 3.

FIG. 16 shows one example of the coordinate system conversion process by the coordinate system conversion part 225 of FIG. 15. In (a) to (h) of the figure, the photographed images displayed on the photographed image monitor 3 when the coordinate system conversion part 136 is performing the coordinate system conversion processes shown respectively in FIG. 14(*a*) to (*h*) are shown.

FIG. 16(*a*) is a photographed image when the coordinate system conversion is not performed. FIGS. 16(*b*) to (*d*) are images in which the photographed image is rotated to the right by 90 degrees, 180 degrees, and 270 degrees. FIG. 16(*e*) is an image in which the photographed image is mirror-imaged with respect to the Y axis. FIGS. 16(*f*) to (*h*) are images in which the mirror-imaged image of (e) is further rotated to the right by 90 degrees, 180 degrees, and 270 degrees.

In the laser processing apparatus 100 according to the present embodiment, the coordinate system conversion part 225 is arranged in the marker controller 22, and such coordinate system conversion part 225 performs the coordinate system conversion similar to the coordinate system conversion part 136 on the photographed image. Thus, the movement of the processing object 120 in the arrangement specifying area 12 can be coincided with the movement of the light receiving axis on the photographed image displayed on the photographed image monitor 3. Therefore, it becomes easy for the user to understand intuitively, and the working efficiency of the position adjustment and the tilt adjustment can be enhanced.

In the present embodiment, a case where the coordinate system conversion parts 135 and 136 in the processed data generating device 1 perform the coordinate system conversion process including rotation and mirror-imaging of the coordinate system has been described, but such coordinate system conversion parts 135 and 136 can also perform the coordinate system conversion process taking a relative tilt of the scanning plane and a processing plane into consideration. However, the corresponding process is not necessarily required for such coordinate system conversion process in the coordinate system conversion process 225. That is, if the scanning plane defined by the XY directions of the scanning part 215 and the processing plane on the work W are tilted rather than being parallel, tilt adjustment is performed in the coordinate system conversion parts 135 and 136 so that the processing pattern in the setting plane coincides with the processing pattern when the processing plane is seen from the front. This tilt adjustment corresponds to a process of having a length in the X direction as cos θx times, and the length in the Y direction as cos θy times, where θx is an angle formed by the processing plane and the scanning plane with respect to the X axis (i.e., on YX plane), and θy is an angle formed by the processing plane and the scanning plane with respect to the Y axis (i.e., on XZ plane). The influence of performing such tilt adjustment on the photographed image on the photographed image monitor 3 is equivalent to changing the display magnification with respect to the X direction and the Y direction of the photographed image, and thus does not inhibit the intuitive understanding of the user.

In each embodiment described above, a case where the processing object 120 displayed in the arrangement specifying area 12 by the processed data generating device 1 is the rectangular processing region 121, and the reference handle 123 is provided to the four vertices and the center of gravity has been described, but the present invention is not limited to such case.

Figure 17:
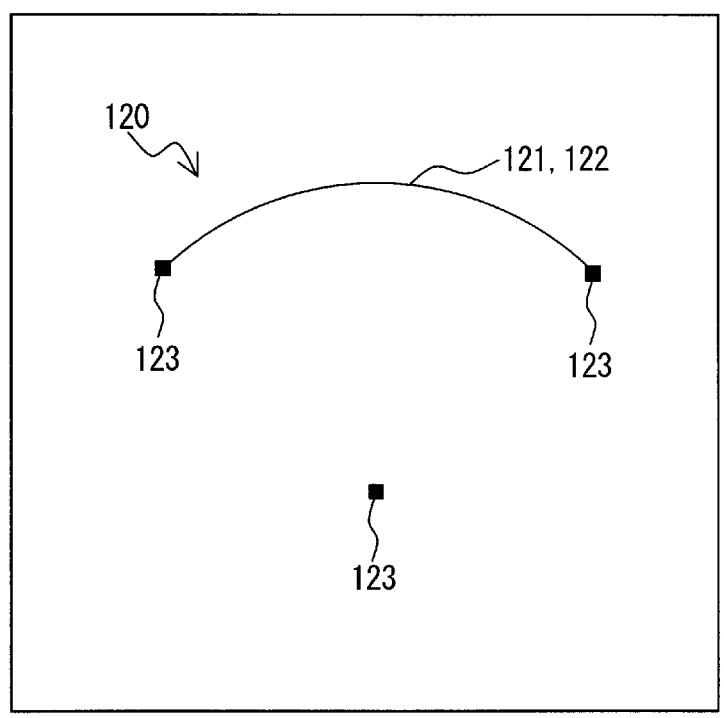
FIG. 17 shows one example of a processing object 120 when the processing pattern has a circular arc shape.
Figure 18:
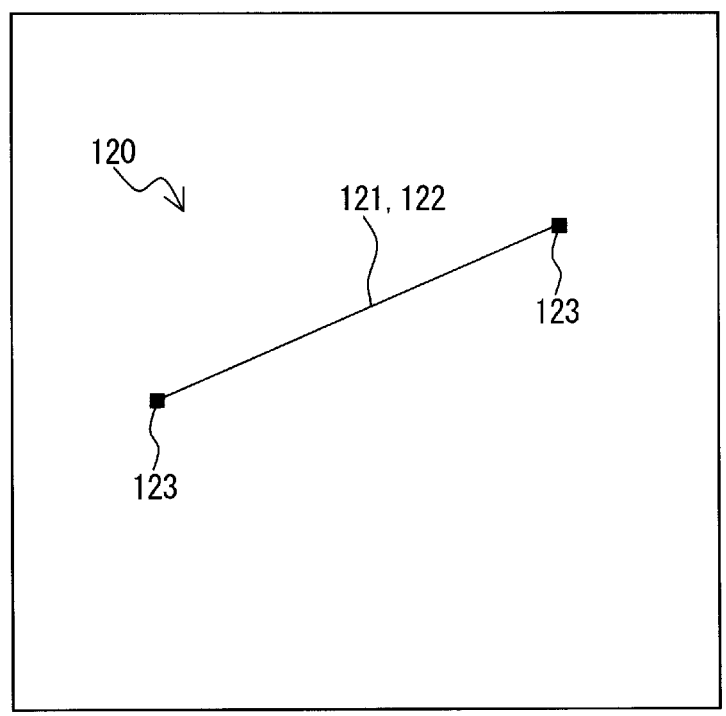
FIG. 18 shows one example of the processing object 120 when the processing pattern has a linear shape.
Figure 19:
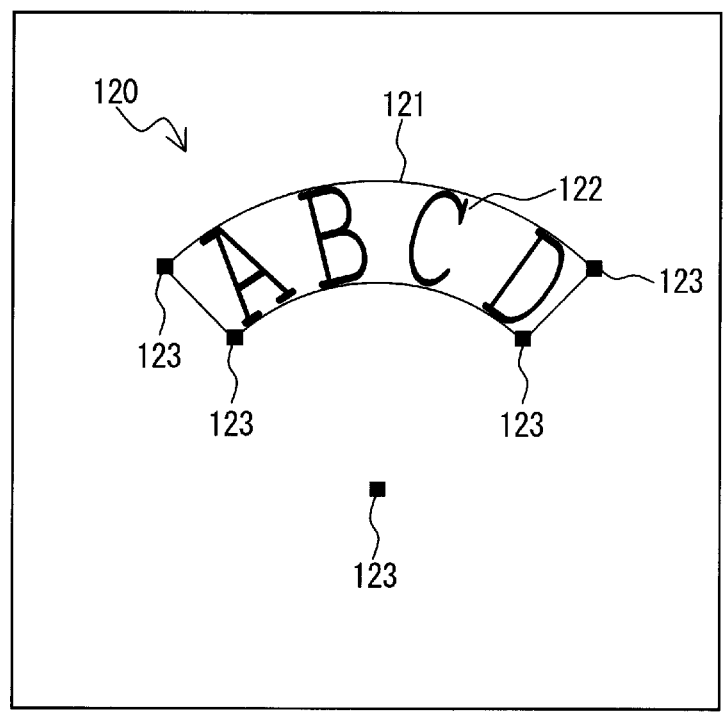
FIG. 19 shows one example of the processing object 120 when the processing pattern is a character string arrayed in a circular arc shape.
Figure 20:
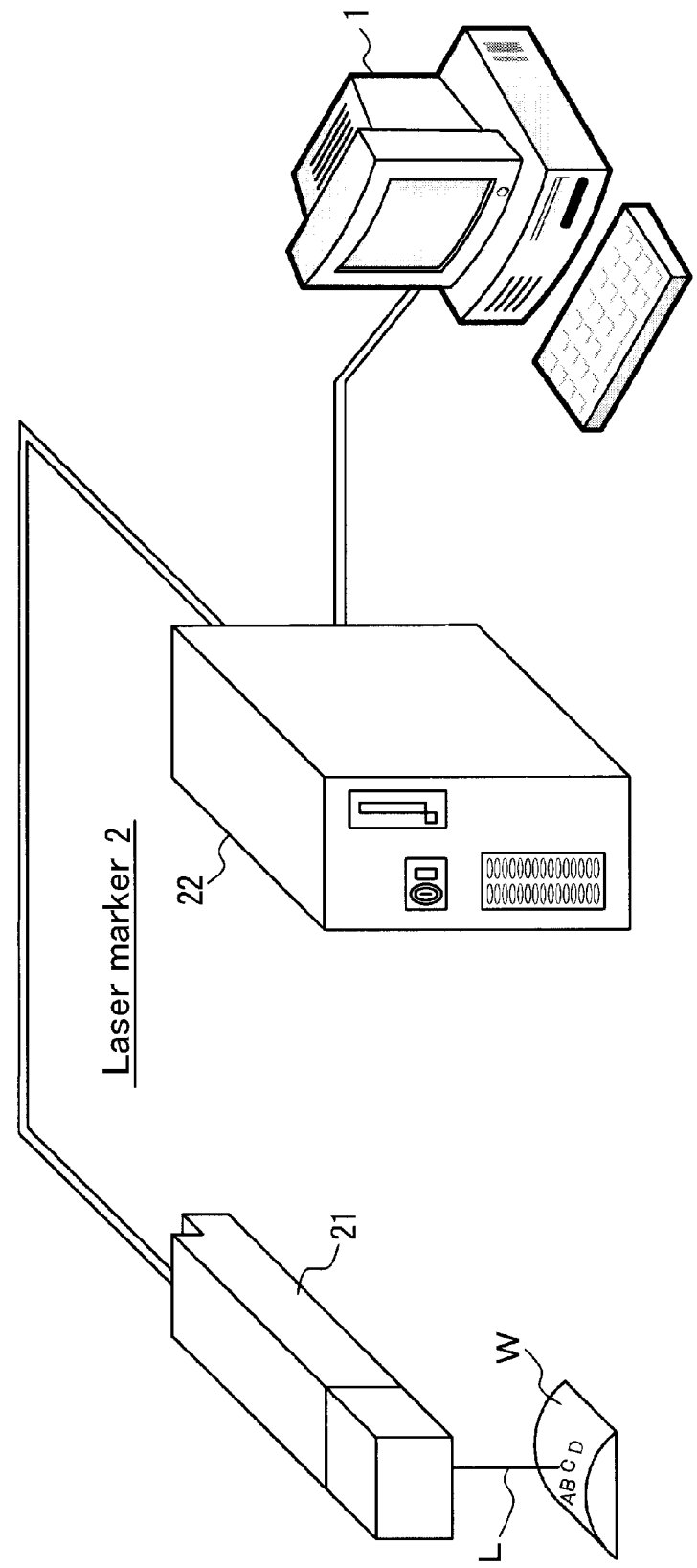
FIG. 20 is a view showing a schematic configuration of a conventional laser processing apparatus 101.
Figure 21:
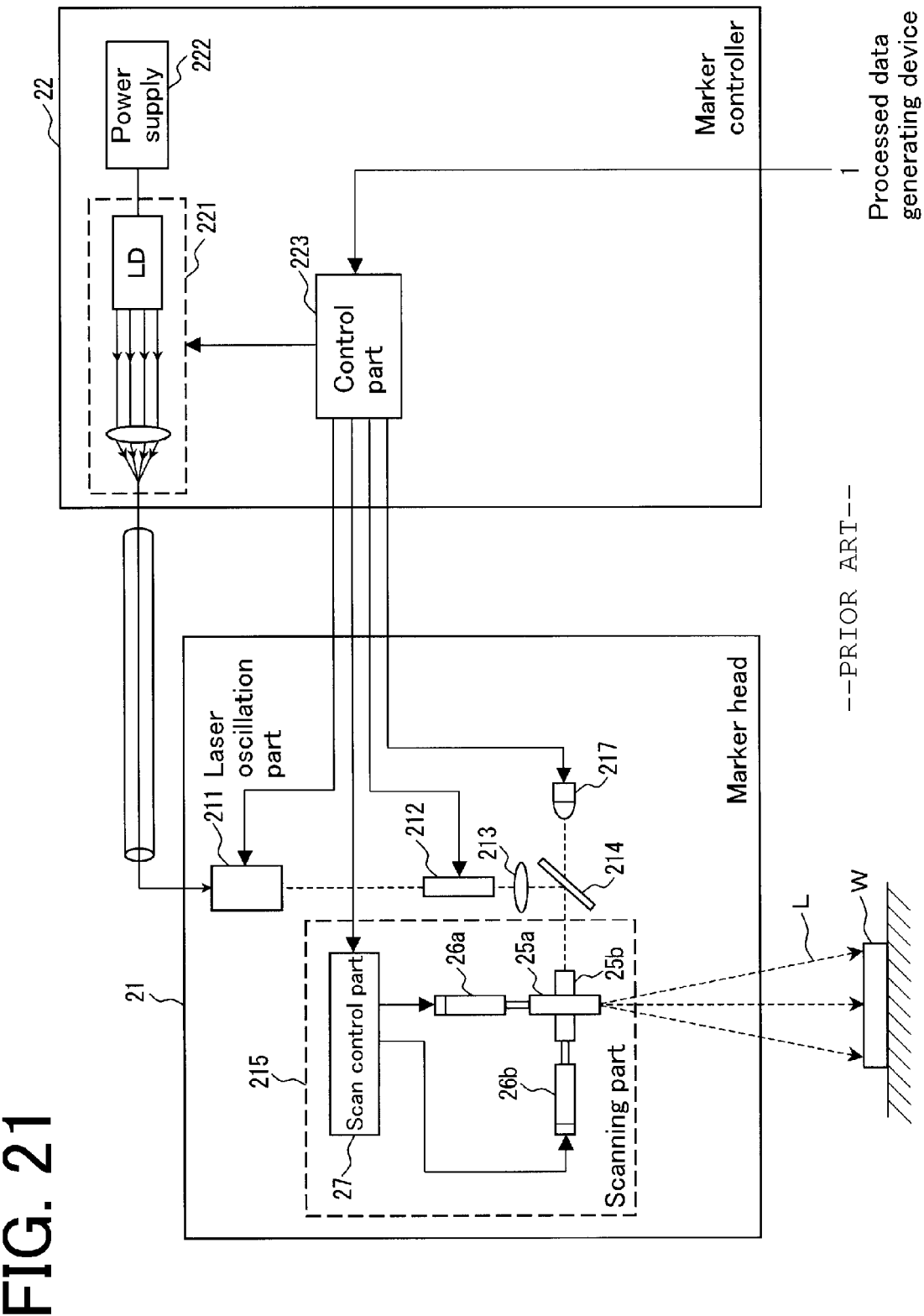
FIG. 21 is a view showing one example of an improved laser processing apparatus of the prior art, and shows the configuration of the laser marker 2.
Figure 22:
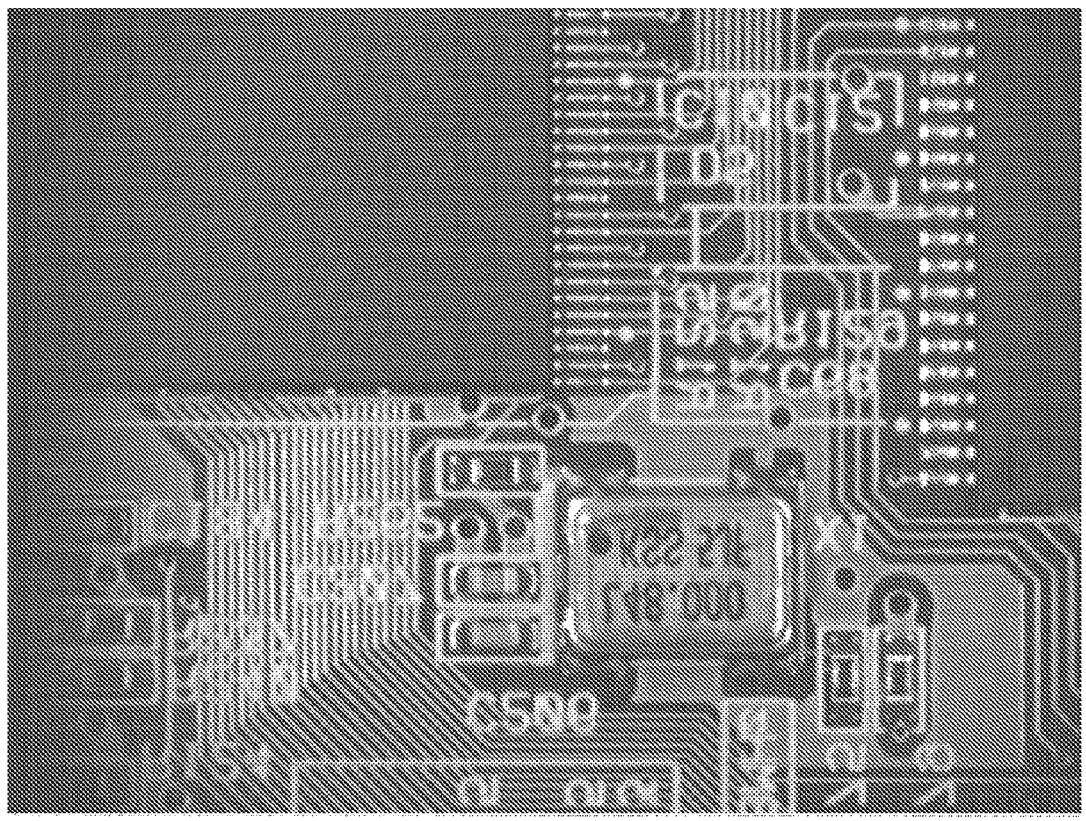
FIG. 22 is a view showing one example of a photographed image of a middle of a scanning region.
Figure 23:
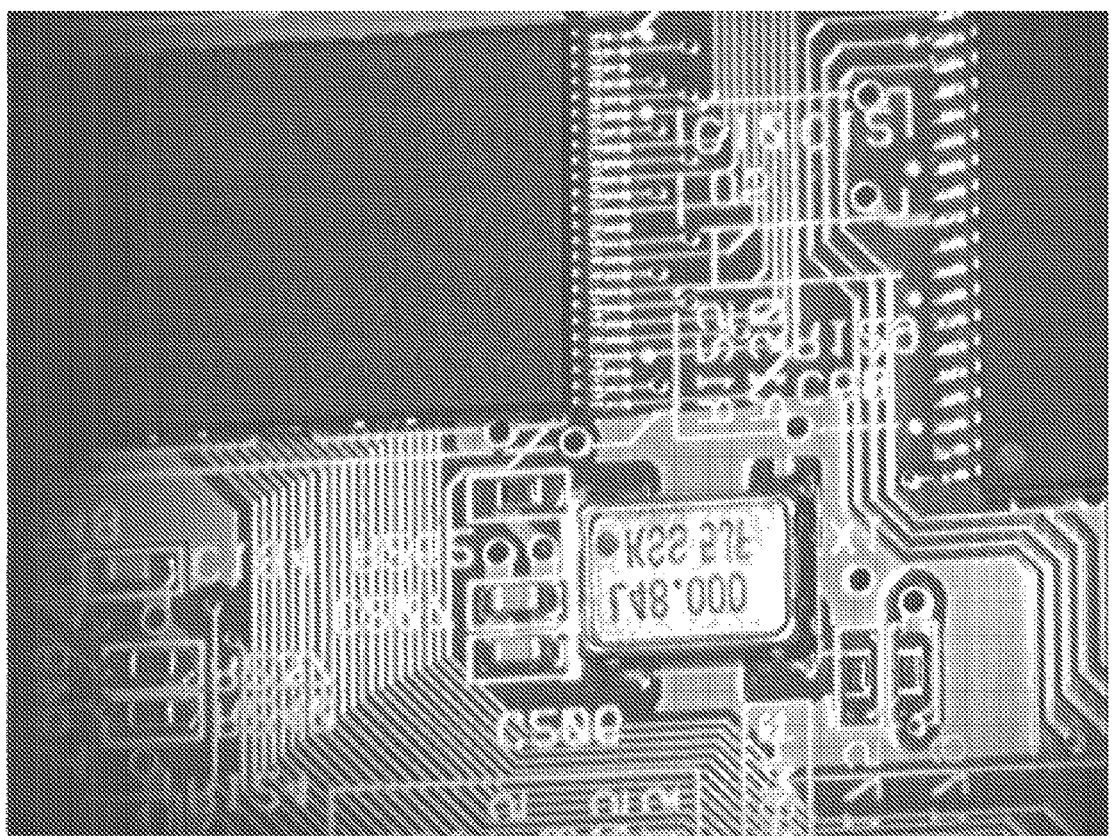
FIG. 23 is a view showing one example of a photographed image of a peripheral part of the scanning region.

FIGS. 17 to 19 are views showing another example of the processing object 120. FIG. 17 shows one example of the processing object 120 when the processing pattern has a circular arc shape. This processing object 120 includes a circular arc shaped processing pattern 122 and three reference handles 123. In this case, the processing region 121 coincides with the processing pattern 122. The reference handle 123 is arranged at both ends of the processing pattern 122 and the center of the circular arc.

FIG. 18 shows one example of the processing object 120 when the processing pattern has a linear shape. This processing object 120 includes a linear processing pattern 122 and two reference handles 123. In this case as well, the processing region 121 coincides with the processing pattern 122. The reference handle 123 is arranged at both ends of the processing pattern 122.

FIG. 19 shows one example of the processing object 120 when the processing pattern is a character string arrayed in a circular arc shape. This processing object 120 includes the processing region 121 surrounded by concentric circular arcs of different radii and a radius, the processing pattern 122 in which the character string is arrayed in the circular arc shape, and five reference handles 123. Each character configuring the processing pattern 122 is arrayed along the circular arc so that the center point of the circular arc is downward, and is included in the processing region 121. The reference handle 123 is arranged at both ends of the two circular arcs and the center of such circular arcs.

In either case, the reference handle 123 is arranged at a characteristic position of the processing region 121 or the processing pattern 122. Thus, position adjustment and tilt adjustment can be rapidly and easily performed by selecting one of the reference handles 123 as the reference point 124. An arbitrary position may be specified as the reference point without arranging the reference handle 123 or in addition thereto as a relative position on the processing region 121. That is, the reference point may be arranged in one of an interior, a peripheral edge, or an exterior of the processing region 121 of the processing object 120 as long as it is a point that moves in cooperation with the processing object 120 while maintaining a unique position relationship with the processing object 120.

In the embodiment described above, a case where the scanning part 215 coincides the laser optical axis to the reference point specified on the setting plane by the user during editing of the processed data has been described, but the present invention is not limited to a case of exactly coinciding the laser optical axis to the reference point. The shift between the reference point and the laser optical axis is tolerable to an extent that can be ignored compared to a processing precision of the work W demanded on the laser processing apparatus. Thus, the laser optical axis only needs to substantially coincide with the position in the scanning region corresponding to the reference point.

In the embodiment described above, a case of coinciding the light receiving axis of the camera 216 on the laser optical axis has been described, but the present invention is not limited to exactly coinciding the axes. The shift between the light receiving axis of the camera 216 and the laser optical axis is tolerable to an extent that can be ignored compared to the processing precision of the work W demanded on the laser processing apparatus. Thus, the light receiving axis of the camera 216 merely needs to be substantially coaxial with the laser optical axis.

In the embodiment described above, a case where the processed data generating device 1 and the photographed image monitor 3 are separate devices respectively connected to the marker controller 22 has been described, but the present invention is not limited to such case. The processed data generating device 1 may divide the screen on the setting screen 10 to display the photographed image.

In the embodiment described above, a case of the laser processing apparatus for performing processing in a two-dimensional XY plane has been described, but the present invention is not limited thereto. For instance, it should be recognized that the present invention can also be used to specify the processing position with respect to the XY plane in a three-dimensional laser processing apparatus having a scanning section for scanning the focal position of the laser light beam also in the Z direction.

What is claimed is:

1. A laser processing apparatus comprising a laser light beam source for generating a laser light beam, a mirror configured for reflecting the laser light beam from the laser light beam source, and a controller configured for controlling a drive of the mirror so as to two-dimensionally scan the laser light beam based on a processing pattern, and performing laser processing on an article to be processed in a scanning region of the laser light beam by the controller, the laser processing apparatus comprising:

a setting display section for displaying a two-dimensional setting plane corresponding to the scanning region and the processing pattern within the setting plane;

a pattern arrangement specifying section for specifying an arrangement of the processing pattern on the setting plane displayed by the setting display section and for specifying a reference point that moves in cooperation with the processing pattern on the setting plane while maintaining position relationship with the processing pattern;

a photographing section, arranged on the laser light beam source side from the mirror and including a light receiving axis substantially coaxial with the optical axis of the laser light beam, and configured for photographing a region which is smaller than the scanning region of the laser light beam; and a photographed image display section for displaying an image photographed by the photographing section and an axis position of the light receiving axis on the photographed image, wherein the controller controls a drive of the mirror so as to substantially coincide the light receiving axis on a correspondence position in the scanning region corresponding to the reference point specified on the setting plane by the pattern arrangement specifying section, prior to performing laser processing on the article to be processed.

2. The laser processing apparatus according to claim 1, wherein a processing region for specifying the arrangement of the processing pattern is displayed on the setting plane; and the reference point is a feature point of the processing region.

3. The laser processing apparatus according to claim 2, wherein the processing region is a rectangular region, and the reference point is one vertex of the rectangular region.

4. The laser processing apparatus according to claim 1, wherein the setting display section displays the position of the reference point on the setting plane.

5. The laser processing apparatus according to claim 1, wherein a position corresponding to the light receiving axis of the photographing section is substantially a middle of the photographed image displayed by the photographed image display section.

6. The laser processing apparatus according to claim 5, wherein the photographing section includes a two-dimensional imaging element in which a great number of light receiving elements are arrayed so that the light receiving axis is positioned substantially at the middle.

7. The laser processing apparatus according to claim 1, wherein the photographed image is an enlarged image of at least one part of the article to be processed.

8. The laser processing apparatus according to claim 1, wherein the photographing section performs photographing based on operation.

9. The laser processing apparatus according to claim 8, wherein when a specified arrangement of the processing pattern is changed, the controller controls the drive of the mirror, and the photographing section performs photographing.

10. The laser processing apparatus according to claim 8, wherein a plurality of processing patterns is arranged in the setting plane; and when one of the processing patterns is specified, the controller controls the drive of the mirror, and the photographing section performs photographing.

11. The laser processing apparatus according to claim 1, further comprising a reference point specifying section for specifying the reference point on the setting plane as a relative position with respect to the processing pattern.

12. The laser processing apparatus according to claim 1, further comprising a processing pattern specifying section for specifying the processing pattern.

13. The laser processing apparatus according to claim 1, wherein the processing position specifying section displaces in parallel the processing pattern on the setting plane.

14. The laser processing apparatus according to claim 1, wherein the processing position specifying section rotates the processing pattern on the setting plane with a predetermined point other than the reference point as a center of rotation.

15. The laser processing apparatus according to claim 1, wherein the controller obtains a position in the scanning region from the position of the reference point in the setting plane by performing a coordinate system conversion process including rotation or mirror-imaging of a coordinate system; and the photographed image display section displays a photographed image after the conversion process corresponding to the rotation or the mirror-imaging of the coordinate system.

* * * * *